US007698011B2

(12) United States Patent
Tsuda et al.

(10) Patent No.: US 7,698,011 B2
(45) Date of Patent: Apr. 13, 2010

(54) OPERATING CONDITION MONITORING APPARATUS, METHOD FOR MONITORING OPERATING CONDITION AND PROGRAM

(75) Inventors: Manabu Tsuda, Kyoto (JP); Toru Fujii, Kyoto (JP)

(73) Assignee: Omron Corporation, Kyoto (JP)

( * ) Notice: Subject to any disclaimer, the term of this patent is extended or adjusted under 35 U.S.C. 154(b) by 250 days.

(21) Appl. No.: 11/923,173

(22) Filed: Oct. 24, 2007

(65) Prior Publication Data
US 2008/0103715 A1 May 1, 2008

(30) Foreign Application Priority Data
Oct. 27, 2006 (JP) ............... 2006-293075

(51) Int. Cl.
*G06F 19/00* (2006.01)
(52) U.S. Cl. .................. 700/108; 700/11; 702/182
(58) Field of Classification Search .............. 700/95, 700/108, 109, 111, 159, 169, 174, 175, 177; 702/81, 176, 182, 184
See application file for complete search history.

(56) References Cited

U.S. PATENT DOCUMENTS

| 3,417,916 A | | 12/1968 | Brockel et al. | |
|---|---|---|---|---|
| 6,459,946 B1 | * | 10/2002 | Villanova et al. | ............ 700/111 |
| 6,556,949 B1 | * | 4/2003 | Lyon | ............ 702/182 |
| 7,065,426 B2 | * | 6/2006 | Valentini et al. | ............ 700/111 |
| 2002/0052667 A1 | * | 5/2002 | Martin et al. | ............ 700/111 |

FOREIGN PATENT DOCUMENTS

| DE | 1 535 905 | 1/1966 |
|---|---|---|
| EP | 0 540 752 A1 | 5/1993 |
| EP | 0 924 046 A2 | 6/1999 |
| JP | 05-200657 | 8/1993 |
| JP | 07-105285 | 4/1995 |
| JP | 08-077418 | 3/1996 |
| JP | 10-124477 | 5/1998 |

(Continued)

OTHER PUBLICATIONS

Koujoukanri, "Reduction of Mechanical Downtime and Improvement of Operational Availability,:" Factory Management, Extra Edition, vol. 51, No. 11, Aug. 2005, pp. 30-31.
European Search Report EP 07 11 9185 dated Sep. 11, 2009.

*Primary Examiner*—Charles R Kasenge
(74) *Attorney, Agent, or Firm*—Foley & Lardner LLP

(57) ABSTRACT

An operating condition monitoring apparatus includes a load-time information acquisition unit 203 obtaining load-time information, of one or more production apparatuses 11, concerning load time allocated to production within a predetermined period, an operating-time information acquisition unit 204 obtaining operating-time information, of one or more production apparatuses 11, concerning operating time that is operable time for the production apparatuses within the predetermined period, an individual operating-rate calculation unit 205 calculating an individual operating rate of one or more production apparatuses 11 by dividing the operating time indicated in the operating-time information by the load time indicated in the load-time information, and an output unit 213 outputting the individual operating rate, in order to identify the production apparatus causing the stoppage of a production line.

13 Claims, 13 Drawing Sheets

FOREIGN PATENT DOCUMENTS

| | | |
|---|---|---|
| JP | 11-110036 | 4/1999 |
| JP | 2000-123085 | 4/2000 |
| JP | 2002-297803 | 10/2002 |
| JP | 2003-257808 | 9/2003 |
| JP | 2004-246404 | 9/2004 |
| WO | WO 96/40316 | 12/1996 |

* cited by examiner

FIG. 8

| ROUTE | LINE 002 | | | | | | | |
|---|---|---|---|---|---|---|---|---|
| NODE NAME | EQUIPMENT A | | | | | | | |
| ORDER | NORMAL OPERATION | ABNORMAL STOP | MANUAL STOP | NO WORK FOR PREPROCESS | FULL WORK FOR POSTPROCESS | DATE | TIME | SECOND |
| 1 | 0 | 0 | 0 | 0 | 0 | 2006/04/14 | 12:53:14 | 0 |
| 2 | 1 | 0 | 0 | 0 | 0 | 2006/04/14 | 12:53:14 | 0 |
| 3 | 1 | 0 | 0 | 0 | 0 | 2006/04/14 | 12:54:31 | 77 |
| 4 | 0 | 0 | 1 | 0 | 0 | 2006/04/14 | 12:54:31 | 77 |
| 5 | 0 | 0 | 1 | 0 | 0 | 2006/04/14 | 12:54:36 | 82 |
| 6 | 1 | 0 | 0 | 0 | 0 | 2006/04/14 | 12:54:36 | 82 |
| 7 | 1 | 0 | 0 | 0 | 0 | 2006/04/14 | 12:55:21 | 127 |
| 8 | 0 | 0 | 0 | 0 | 1 | 2006/04/14 | 12:55:21 | 127 |
| 9 | 0 | 0 | 0 | 0 | 1 | 2006/04/14 | 12:55:24 | 130 |
| 10 | 0 | 0 | 1 | 0 | 0 | 2006/04/14 | 12:55:24 | 130 |
| 11 | 0 | 0 | 1 | 0 | 0 | 2006/04/14 | 12:55:26 | 132 |
| 12 | 1 | 0 | 0 | 0 | 0 | 2006/04/14 | 12:55:26 | 132 |
| 13 | 1 | 0 | 0 | 0 | 0 | 2006/04/14 | 12:57:14 | 240 |
| 14 | 0 | 1 | 0 | 0 | 0 | 2006/04/14 | 12:57:14 | 240 |
| 15 | 0 | 1 | 0 | 0 | 0 | 2006/04/14 | 12:58:21 | 307 |
| 16 | 0 | 0 | 1 | 0 | 0 | 2006/04/14 | 12:58:21 | 307 |
| 17 | 0 | 0 | 1 | 0 | 0 | 2006/04/14 | 12:58:58 | 344 |
| . | . | . | . | . | . | . | . | . |
| . | . | . | . | . | . | . | . | . |
| . | . | . | . | . | . | . | . | . |
| . | . | . | . | . | . | . | . | . |

FIG.9

| ROUTE | LINE 002 | | | | | | | | |
|---|---|---|---|---|---|---|---|---|---|
| NODE NAME | EQUIPMENT A | | | | | | | | |
| ORDER | NORMAL OPERATION | ABNORMAL STOP | RESTORATION TASK | MODEL CHANGE | NO WORK FOR PREPROCESS CONTINUATION | FULL WORK FOR POSTPROCESS CONTINUATION | DATE | TIME | SECOND |
| 1 | 0 | 0 | 0 | 0 | 0 | 0 | 2006/04/14 | 12:53:14 | 0 |
| 2 | 1 | 0 | 0 | 0 | 0 | 0 | 2006/04/14 | 12:53:14 | 0 |
| 3 | 1 | 0 | 0 | 0 | 0 | 0 | 2006/04/14 | 12:54:31 | 77 |
| 4 | 0 | 0 | 0 | 1 | 0 | 0 | 2006/04/14 | 12:54:31 | 77 |
| 5 | 0 | 0 | 0 | 1 | 0 | 0 | 2006/04/14 | 12:54:36 | 82 |
| 6 | 1 | 0 | 0 | 0 | 0 | 0 | 2006/04/14 | 12:54:36 | 82 |
| 7 | 1 | 0 | 0 | 0 | 0 | 0 | 2006/04/14 | 12:55:21 | 127 |
| 8 | 0 | 0 | 0 | 0 | 0 | 1 | 2006/04/14 | 12:55:21 | 127 |
| 9 | 0 | 0 | 0 | 0 | 0 | 1 | 2006/04/14 | 12:55:26 | 132 |
| 10 | 1 | 0 | 0 | 0 | 0 | 0 | 2006/04/14 | 12:55:26 | 132 |
| 11 | 1 | 0 | 0 | 0 | 0 | 0 | 2006/04/14 | 12:57:14 | 240 |
| 12 | 0 | 1 | 0 | 0 | 0 | 0 | 2006/04/14 | 12:57:14 | 240 |
| 13 | 0 | 1 | 0 | 0 | 0 | 0 | 2006/04/14 | 12:58:21 | 307 |
| 14 | 0 | 0 | 1 | 0 | 0 | 0 | 2006/04/14 | 12:58:21 | 307 |
| 15 | 0 | 0 | 1 | 0 | 0 | 0 | 2006/04/14 | 12:58:58 | 344 |

FIG.10

| CALCULATION DATE AND TIME | | EQUIPMENT A | | EQUIPMENT B | | EQUIPMENT C | | EQUIPMENT D | |
|---|---|---|---|---|---|---|---|---|---|
| DATE | TIME | LOAD TIME | OPERATING TIME | LOAD TIME | OPERATING TIME | LOAD TIME | OPERATING TIME | LOAD TIME | OPERATING TIME |
| 2006/04/14 | 13:00 | 3506 | 1293 | 3004 | 2003 | 3481 | 2759 | 3038 | 2883 |
| 2006/04/14 | 14:00 | 3490 | 2958 | 3368 | 2053 | 3561 | 3054 | 3309 | 2266 |
| 2006/04/14 | 15:00 | 3493 | 2004 | 3527 | 1863 | 3488 | 1341 | 3115 | 2304 |
| 2006/04/14 | 16:00 | 3337 | 1618 | 3184 | 2024 | 3289 | 1643 | 3547 | 2850 |
| 2006/04/14 | 17:00 | 3302 | 1563 | 3545 | 1334 | 3598 | 3276 | 3281 | 2648 |
| 2006/04/14 | 18:00 | 3437 | 2150 | 3143 | 2671 | 3539 | 2946 | 3043 | 2922 |
| 2006/04/14 | 19:00 | 3300 | 2598 | 3100 | 2630 | 3029 | 1954 | 3098 | 2732 |
| . | . | . | . | . | . | . | . | . | . |

FIG.11

| ID | CALCULATION DATE AND TIME | | EQUIPMENT A | EQUIPMENT B | EQUIPMENT C | EQUIPMENT D |
|---|---|---|---|---|---|---|
| | DATE | TIME | | | | |
| 1 | 2006/04/14 | 13:00 | 0.37 | 0.67 | 0.79 | 0.95 |
| 2 | 2006/04/14 | 14:00 | 0.85 | 0.61 | 0.86 | 0.68 |
| 3 | 2006/04/14 | 15:00 | 0.57 | 0.53 | 0.38 | 0.74 |
| 4 | 2006/04/14 | 16:00 | 0.48 | 0.64 | 0.50 | 0.80 |
| 5 | 2006/04/14 | 17:00 | 0.47 | 0.38 | 0.91 | 0.81 |
| 6 | 2006/04/14 | 18:00 | 0.63 | 0.85 | 0.83 | 0.96 |
| 7 | 2006/04/14 | 19:00 | 0.79 | 0.85 | 0.65 | 0.88 |
| . | . | . | . | . | . | . |

OPERATING CONDITION MONITORING APPARATUS, METHOD FOR MONITORING OPERATING CONDITION AND PROGRAM

This application claims priority from Japanese patent application 2006-293075, filed on Oct. 27, 2006. The entire content of the aforementioned application is incorporated herein by reference.

BACKGROUND OF THE INVENTION

1. Field of the Invention

The present invention relates to an operating condition monitoring apparatus and things pertinent to the apparatus for monitoring the operating condition of one or more production apparatuses that constitute a production line.

2. Description of Background Art

In order to monitor and evaluate the operating condition of one or more pieces of production equipment, that is, one or more production apparatuses that constitute a production line, it is desired to use an appropriate evaluation index.

A known conventional index to evaluate the operating condition of equipment is overall equipment effectiveness (see, e.g., Japanese unexamined patent publication No. 2000-123085 [page 1, FIG. 1, etc.] and Japanese unexamined patent publication No. 7-105285 [page 1, FIG. 1, etc]).

The overall equipment effectiveness is an index indicating total efficiency of production equipment in a production line and given by the following formula.

overall equipment effectiveness=fully productive time/load time

The load time is given by subtracting planned equipment downtime from an possible operating time. The value obtained by subtracting equipment downtime caused by breakdowns and losses in waiting for setup and adjustment from the load time is referred to as an operating time. The value obtained by subtracting equipment downtime caused by speed losses including reduced speed and temporary stops from the operating time is referred to as a net operating time. The fully productive time is given by subtracting time relating to defective losses including improper processes and yield reduction from the net operating time.

Such overall equipment effectiveness is suitable to obtain the resultant efficiency of the equipment that has actually been operated. Since a stoppage of one piece of production equipment usually causes the other pieces of equipment to stop, the values of the actually-calculated overall equipment effectiveness of one or more pieces of equipment in a production line are approximately all the same. In short, this overall equipment effectiveness indicates values close to the operation rate of the whole production line.

There is another index to evaluate the operating condition, that is operational availability (see, e.g., "Reduction of mechanical downtime and improvement of operational availability", Koujoukanri (Factory Management), extra edition, August 2005, Vol. 51, No. 11, pp. 30 to 31). This operational availability can be expressed by the following formula.

Operational availability=net operating time/(net operating time+downtime caused by the equipment itself)

The operational availability is an index excluding an influence exerted by the stoppage of other pieces of equipment, more specifically, an index calculated without the downtime caused by the other pieces of equipment, and therefore is suitable to obtain efficiency of actual operation of each piece of the equipment.

With the above-mentioned overall equipment effectiveness, however, it is difficult to identify equipment to be the cause of the production line stoppage from the operating condition of the equipment.

The stoppage of a production line caused by one piece of equipment lowers the overall equipment effectiveness of every piece of equipment in the production line. Because of this, even if there is a piece of equipment having low overall equipment effectiveness, it cannot be judged whether the equipment stopped because of its own fault or because of the other piece of equipment's fault. Consequently, it is impossible to judge whether the equipment having low overall equipment effectiveness is a main factor to stop the production line.

In the case of the above-mentioned operational availability, even if the lengths of downtimes caused by the equipment itself are the same per unit time, its operational availability takes different values according to the length of downtime caused by the other equipment. Therefore, the operational availability is also not appropriate as an index to identify equipment causing the production line to stop.

For instance, where the load time is 60 minutes, the net operating time is 50 minutes, the downtime caused by the equipment itself is 10 minutes, and the downtime caused by the other equipment is 0 minutes;

operational availability=50/(50+10)×100=83%.

On the other hand, where the load time is 60 minutes, which is the same as the above case, the net operating time is 20 minutes, the downtime caused by the equipment itself is 10 minutes, the downtime caused by the other equipment is 30 minutes;

operational availability=20/(20+10)×100=67%.

As is apparent from the above, even if the lengths of the downtimes caused by the equipment itself are the same, the operational availability takes different values under the influence of the downtime caused by the other equipment. Therefore, it is difficult to analyze to find equipment to be a factor of the production line stoppage with the use of the operational availability of each piece of equipment.

SUMMARY OF THE INVENTION

The operating condition monitoring apparatus of the present invention monitors the operating condition of one or more production apparatuses, and comprises: a load-time information acquisition unit for obtaining load-time information, of the one or more production apparatuses, concerning load time allocated to production within a predetermined period; an operating-time information acquisition unit for obtaining operating-time information, of one or more production apparatuses, concerning operating time, in which the equipment is in an operable state, within the predetermined period; an individual operating-rate calculation unit for calculating an individual operating rate, of the one or more production apparatuses, by dividing the operating time indicated in the operating-time information by the load time indicated in the load-time information; and an output unit for outputting the individual operating rate.

According to the operating condition monitoring apparatus, the operating conditions of production apparatuses can be compared with each other based on the individual operating rate, of each production apparatus constituting a production line, that is an index of downtime caused by the production apparatus itself, thereby identifying a production apparatus that causes the production line to stop.

The operating condition monitoring apparatus of the present invention further comprises a state-information acquisition unit for obtaining state information, of one or more production apparatuses, concerning the initiation time and termination time of a normal operating state, an abnormal stop state, a manual stop state and a stop state caused by work, and a time-information structure unit. The time-information structure unit calculates downtime caused by the apparatus itself, of one or more production apparatuses, which is the sum of time of the abnormal stop state obtained from the state information and time of the manual stop that comes immediately after the time of the abnormal stop state and is obtained from the state information, and downtime caused by the other production apparatus, which is the sum of time of the manual stop state obtained from the state information and time of the stop state caused by work that comes immediately after the time of the manual stop state and is obtained from the state information, in order to prepare the load-time information indicating the sum total of the time of the normal operating state obtained from the state information, the downtime caused by the production apparatus itself and the downtime caused by the other production apparatus. The time-information structure unit also prepares the operating-time information indicating the sum total of the time of the normal operating state and the downtime caused by the other production apparatus.

According to the operating condition monitoring apparatus, the individual operating rate can be calculated by obtaining the downtime caused by the production apparatus itself and the downtime caused by the other production apparatus from the state information output from the production apparatus without making a change to the production apparatus so as to output different information.

The operating condition monitoring apparatus of the present invention further comprises a loss determination unit for determining downtime that is the sum of one or more times of the manual stop state that come immediately after the time of the abnormal stop state and are obtained from the state information and one or more times of the abnormal stop state that come immediately before one or more of the time of the manual stop state and are obtained from the state information, to be a lost time caused by a temporary stop when the downtime is smaller than a previously set predetermined threshold, determining the downtime to be a lost time caused by failures of the production apparatus itself when the downtime is larger than the predetermined threshold, and determining time of the manual stop state that comes immediately after the time of the normal operating state to be a lost time caused by setup task. The time of the manual stop state immediately after the abnormal stop state and the time of the manual stop state immediately after the time of the normal operating state are selected from one or more times of the manual stop state obtained from the state information. The output unit outputs the determination results of the loss determination unit.

According to the operating condition monitoring apparatus, detailed factors of stopping the production apparatus can be discovered.

The operating condition monitoring apparatus of the present invention further comprises a defective-rate acquisition unit and a defective-loss calculation unit. At least one of one or more production apparatuses is an apparatus for inspecting for defective pieces in work. The defective-rate acquisition unit obtains defective rate information, which concerns a defective rate of products and is output from the inspection apparatus. The defective-loss calculation unit calculates losses caused by the defective pieces from the sum of the times of the normal operating state obtained by the state information and the defective rate indicated by the defective rate information. The output unit outputs the calculation results of the defective-loss calculation unit.

According to the operating condition monitoring apparatus, it is possible to grasp the losses due to defective pieces, and therefore operators and supervisors on site can intuitively recognize the importance to stop the production apparatus.

The operating condition monitoring apparatus of the present invention further comprises a loss-index calculation unit for calculating a loss index of one or more production apparatuses from the individual operating rate and the load-time information. The loss index indicates losses caused by a stoppage of the production apparatus itself. The output unit outputs the loss index.

According to the operating condition monitoring apparatus, it is easier to grasp the losses caused by the operating condition.

In the operating condition monitoring apparatus of the present invention, the output unit selects the lowest individual operating rate among the individual operating rates of the one or more production apparatuses and highlights the selected individual operating rate upon output.

Therefore the operating condition monitoring apparatus can aid in deciding the restoring order of the production apparatuses constituting the production line.

In the operating condition monitoring apparatus of the present invention, the output unit compares the individual operating rate of the one or more production apparatuses with a predetermined threshold and outputs a warning about the production apparatus having the individual operating rate lower than the predetermined threshold.

According to the operating condition monitoring apparatus, it is possible to notify the operators and so on of the production apparatus requiring a restoration task.

In the operating condition monitoring apparatus of the present invention, the output unit outputs restoration priority of the one or more production apparatuses in the order from the apparatus having the lowest individual operating rate to the highest.

Therefore, the operating condition monitoring apparatus can aid in deciding the restoring order of the production apparatuses constituting the production line.

In the operating condition monitoring apparatus of the present invention, the load-time information acquisition unit and operating-time information acquisition unit obtain load-time information and operating-time information for a plurality of predetermined periods, the individual operating-rate calculation unit calculates the individual operating rate in every predetermined period, and the output unit outputs information indicating the movement of the individual operating rate.

According to the operating condition monitoring apparatus, the operators and so on can grasp the trend of the operating condition of each production apparatus, thereby predicting the occurrence of abnormal events.

In the operating condition monitoring apparatus of the present invention, the load-time information acquisition unit and operating-time information acquisition unit obtain load-time information and operating-time information for a plurality of predetermined periods, and the individual operating-rate calculation unit calculates an individual operating rate in every predetermined period. The operating condition monitoring apparatus further comprises a maintenance-timing detection unit for detecting a pattern of the individual operating rate change from the movement of the individual operating rate in every predetermined period and detecting the maintenance time of the one or more production apparatuses based on the pattern of the individual operating rate change, and a maintenance-timing notification unit for notifying that the maintenance time has come when the maintenance time detected by the maintenance-timing detection unit came.

According to the operating condition monitoring apparatus, the operators and so on can know the maintenance time has come.

In the operating condition monitoring apparatus of the present invention, the load-time information acquisition unit and operating-time information acquisition unit obtain load-time information and operating-time information for a plurality of predetermined periods, and the individual operating-rate calculation unit calculates an individual operating rate in every predetermined period. The operating condition monitoring apparatus further comprises a prediction unit for predicting changes in the individual operating rates based on the individual operating rates in every predetermined period. The output unit outputs the prediction results of the changes in the individual operating rate.

According to the operating condition monitoring apparatus, it is possible to predict the operating condition of each production apparatus.

In the operating condition monitoring apparatus of the present invention, the prediction unit further predicts the time abnormal events occur in the one or more production apparatuses based on the prediction results, and the output unit produces an output according to the additional prediction result of the time abnormal events occur.

According to the operating condition monitoring apparatus, it is possible to predict the occurrence time of the abnormal events for each production apparatus.

According to the operating condition monitoring apparatus of the present invention, it is possible to identify a production apparatus that causes the production line to stop.

BRIEF DESCRIPTION OF THE DRAWINGS

FIG. 8 shows a specific example of the state information used in the operating condition monitoring apparatus.

FIG. 9 shows a specific example of the state information categorized according to the causes of a stoppage by the time-information structure unit of the operating condition monitoring apparatus.

FIG. 10 illustrates an example of the load time and operating time used in the operating condition monitoring apparatus.

FIG. 11 shows individual operating rates calculated by an individual operating-rate calculation unit of the operating condition monitoring apparatus.

DETAILED DESCRIPTION OF THE PREFERRED EMBODIMENTS

Figure 1:
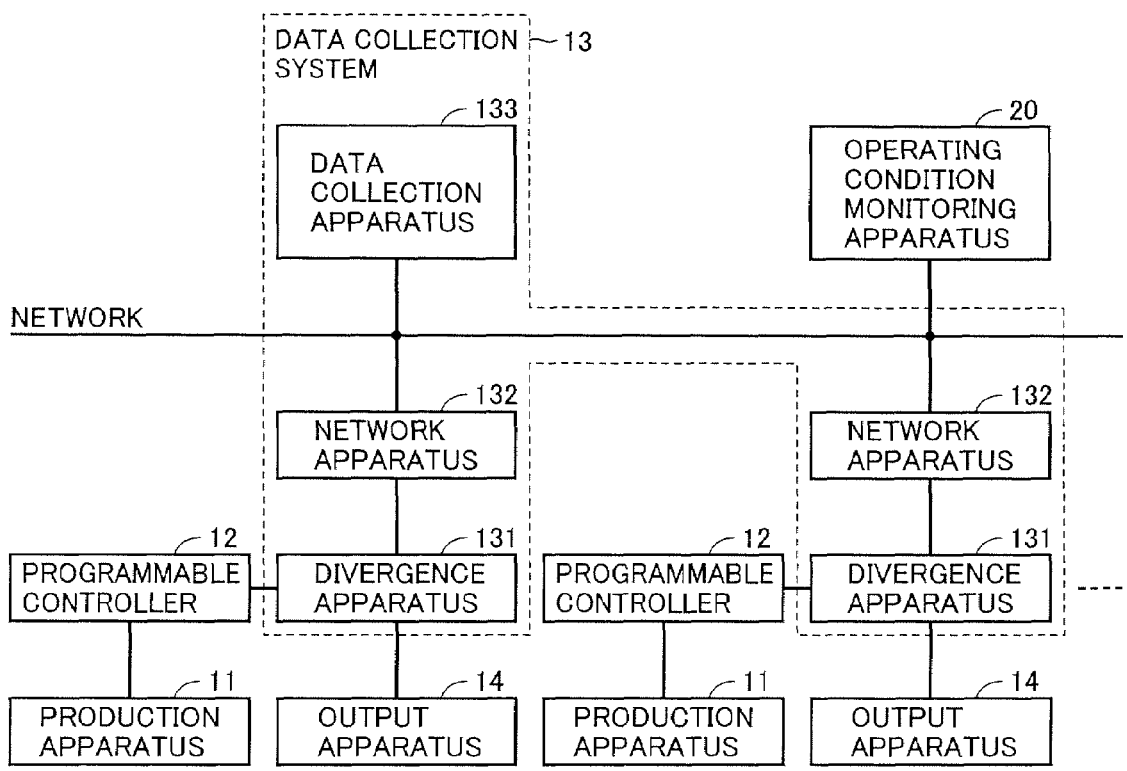
FIG. 1 is a diagram showing the structure of a production system including an operating condition monitoring apparatus according to an embodiment.

Referring to the drawings, an embodiment of the operating condition monitoring apparatus and things pertinent to the apparatus will now be described below. In the following embodiment, since components denoted by the same reference numerals have the same functions, explanations given for such components may not be repeated.

Embodiment

FIG. 1 is a diagram showing the structure of a production system including an operating condition monitoring apparatus according to the embodiment.

The production system includes one or more production apparatuses 11, one or more programmable controllers 12, one or more data collection systems 13, one or more output apparatuses 14 and an operating condition monitoring apparatus 20. The operating condition monitoring apparatus 20 is connected to the data collection systems 13 through a network, communication line or the like. Generally, a production apparatus 11, a programmable controller 12 and an output apparatus 14 are provided as a set. In this production system, a single data collection system 13 is provided to one or more sets of the production apparatus 11, programmable controller 12 and output apparatus 14. Each set of the production apparatus 11, programmable controller 12 and output apparatus 14 is, for example, production equipment that is already being operated.

The production apparatuses 11 are those for producing electric apparatuses, machines or other products and parts, and the goods produced by the production apparatuses are not especially limited. Each production apparatus 11 usually has a different function, but may have the same function with each other. The production apparatus 11 outputs operation information concerning its own operation. The operation information includes: information indicating the initiation and termination of various operations and control of the production apparatus 11; information indicating ON and OFF of a warning sound; information indicating the ON/OFF state and blinking state of signal lights, information indicating a goods-production number of the production apparatus 11 and other information. As long as the operation information is something concerning the operations of the production apparatus 11, it may be information concerning the state of the production apparatus itself, such as "stop" and "occurrence of abnormal event", or information concerning the state of transferring routes around the production apparatus 11. For example, the information may indicate that there is no work on the transferring route, like a conveyer belt, which transfers the work into the production apparatus 11, namely the information indicating "no work", or the information may indicate that there is work overflowed on the transferring route which transfers the work out of the production apparatus 11, namely the information indicating "full work". Usually, such information indicating the state of the transferring route is obtained by a sensor or other elements for detecting the work attached to the transferring route. The "work" described herein means manufactured articles (products) including finished products and workpieces. The data structure of the operation information is not specifically designated. In the embodiment, the operation information chiefly includes the initiation and termination of the states where each production apparatus 11 is in, such as "normal operation", "abnormal stop", "manual stop" and "stop caused by work". The "normal operation" is the state where each production apparatus 11 is normally functioning. The "abnormal stop" is the state where each production apparatus 11 stops because an abnormal event has occurred in each production apparatus 11. The "stop caused by work" is the state where each production apparatus 11 stops due to the condition of the work on the transferring route that transfers the work. More specifically, the "stop caused by work" is the state where each production apparatus 11 stops because of at least one state of "no work" and "full work". The operation information can include "stop caused by no work" and "stop caused by full work" instead of the "stop caused by work". The "manual stop" is the state where each production apparatus 11 is stopped by operator's operation or the like. For example, a stoppage of the production apparatuses due to model change of products is included in the "manual stop" state. In addition to the example, upon occurrence of the "abnormal stop" state and "stop caused by work" state, the production apparatus 11 stops and a warning that the abnormal events have occurred is output. Even if the operators recognize the warning and perform operations to stop the output of the warning, the production apparatuses 11 are usually shifted to the "manual stop" state. During the "manual stop" period, the operator takes action to eliminate the cause of abnormal events in the production apparatuses 11. The production apparatus 11 usually outputs the operation information, in real time, concurrently with acquisition of the operation information. The production apparatus 11 can also output identification information for identifying the production apparatus itself, such as the designation of the production apparatus, with the operation information. Such identification information can be accumulated in advance in a record medium such as memory. At least one of the production apparatuses 11 may be an apparatus to inspect for defective pieces. The apparatus to inspect for defective pieces includes an apparatus having a function of inspecting for defective pieces and an apparatus having a structure to reject the defective pieces from the production line in response to the inspection results in this embodiment. In the case of the apparatus 11 to inspect for defective pieces, the apparatus 11 may calculate a defective rate from the number of defective pieces and the number of total products or good products to prepare and output defective-rate information that indicates the defective rate. The defective rate is usually expressed by "defective rate=defective product number/total product number". Note that the calculated value can be expressed as a percent by multiplying "100". In some cases, the defective rate can be expressed by "defective rate=defective product number/good product number". The defective rate information is, for example, directly or indirectly output to a defective-rate acquisition unit 207 of the operating condition monitoring apparatus 20.

The programmable controllers 12 are special controllers (computers) that control the production apparatuses 11 in accordance with command signals, such as ON/OFF signals, from input devices (not shown), in order to perform sequence control. In addition, the programmable controller 12 receives the operation information, concerning the operation, output from the production apparatus 11, and transmits the information to the output apparatus 14 in order to control the output apparatus 14. Further, the programmable controller 12 includes all controllers and computers, such as a programmable controller (PC), a sequence controller, programmable logic controller (PLC), for performing monitoring sequences for the production apparatus 11.

The data collection systems 13 are systems that obtain the operation information concerning the operations of the production apparatuses 11. The data collection system 13 generally obtains the operation information from the production apparatus 11. In addition to this, the data collection system 13 can obtain the operation information from sensors or other devices attached on the transferring route or other positions in the production line. The data making up the operation information is ON or OFF pulse data or the like. The data collection system 13 is usually located between the production apparatus 11 and the output apparatus 14 that outputs the operation information concerning the operation of the production apparatus 11. This "between" does not mean a spatial gap, but represents a situation where at least one apparatus (in this embodiment, a divergence apparatus 131 that will be described later) of a data collection system 13 receives a signal from a production apparatus 11, and transfers it to the output apparatus 14. For this transfer, the received signal may be transferred either unchanged or after having been processed. In this embodiment, the data collection system 13 receives the operation information from the programmable controller 12. It should be noted that the data collection system 13 can also receive the operation information directly from the production apparatuses 11, and in such a case, the programmable controller 12 would not be required.

The output apparatuses 14 output the operation information, for example, by using a signal light or generating buzzer sounds. The output apparatus 14 does not need to output all of the operation information. The form of the output apparatus 14 for outputting the operation information is not especially limited. The output in this case is a concept that includes transmission to another apparatus such as an apparatus having display means, storage in a record medium and so on.

Each data collection system 13 includes one or more divergence apparatuses 131, one or more network apparatuses 132, a data collection apparatus 133 and a data output apparatus 134. In the data collection system 13, the divergence apparatus 131 and a network apparatus 132 are generally provided as a set, which is provided to each production apparatus 11. The data collection system 13 generally includes: two or more sets of divergence apparatus 131 and network apparatus 132; one data collection apparatus 133; and one data output apparatus 134.

The divergence apparatuses 131 obtain the operation information concerning the operation of the production apparatuses 11, transmit the operation information to the output apparatuses 14 as well as the network apparatuses 132. In this embodiment, the divergence apparatus 131 obtains, among the operation information, information concerning the operation of the production apparatus 11, more specifically, information indicating the initiation and termination of at least the above-mentioned four states, "normal operation", "abnormal stop", "manual stop" and "stop caused by work" of each production apparatus 11, or information indicating the initiation and termination of five states, "normal operation", "abnormal stop", "manual stop", "stop caused by no work" and "stop caused by full work" of each production apparatus 11, and transmits the information to the network apparatus 132. Generally, the divergence apparatus 131 transfers the operation information to the output apparatus 14, unchanged; however, it may process the operation information to change the data structure or may encode the operation information before transferring to the output apparatus 14.

The network apparatuses 132 receive the operation information transmitted from the divergence apparatuses 131, and transmit the information to the data collection apparatus 133. The same data structure needs not be employed for received operation information by the network apparatus 132 and operation information to be transmitted. Furthermore, the operation information can be transmitted with identification information that identifies a production apparatus 11 having output its own operating condition. The identification information may be the designation of the production apparatus 11, the address on a network, like the network apparatus 132, or other identifications. The network apparatus 132 is, for example, a communication apparatus used in a network.

The data collection apparatus 133 receives the operation information transmitted from the network apparatuses 132, adds time information that indicates receipt time of the operation information to the received operation information, and accumulates the information in a record medium, such as memory and a hard disk (not shown). For example, among the received operation information, information indicating the initiation and termination of the four states of the production apparatuses 11, that is, the above-mentioned "normal operation", "abnormal stop", "manual stop" and "stop caused by work", with the addition of the time information indicating time at which the information is obtained, is defined as state information. In this case, the state information indicates the initiation time and termination time of the four states of each production apparatus 11, that is, "normal operation", "abnormal stop", "manual stop" and "stop caused by work". Alternately, the state information may indicate the initiation time and termination time of the five states, of each production apparatus 11, including "stop caused by no work" and "stop caused by full work" instead of the "stop caused by work". In addition, the data collection apparatus 133 can accumulate identification information for identifying the production apparatuses 11 corresponding to their operation information or state information. The accumulation discussed herein is a concept including temporary storage. Description is made for a case where the data collection apparatus 133 adds the time information in this embodiment; it is possible to set the programmable controller 12, divergence apparatus 131 or other elements to add the time information indicating what time the state indicated by the operation information started into the operation information. The time information can indicate not only time of day but also date. The "addition" discussed herein may be preparation of new information which is a combination of the operation information and time information, or formation of groups made up with the corresponding operation information and time information.

The data output apparatus 134 outputs the operation information, of one or more production apparatuses 11, which is received by the data collection apparatus 133 and time information corresponding to the operation information. In this embodiment, the data output apparatus 134 particularly outputs the above-mentioned state information. The data output apparatus 134 does not need to output the four or five pieces of information, which form the state information, at the same time, and can output only one of the four pieces of the information. Timing, a trigger or the like for which the data output apparatus 134 outputs information is not limited. In response to the direction to output information from other apparatuses, for example, the operating condition monitoring apparatus 20 which will be described later, the data output apparatus 134 may retrieve the state information from a record medium, such as memory, and output the information. Alternately, whenever the data collection apparatus 133 receives new operation information, the data output apparatus 134 may output the state information corresponding to the operation information received in real time. The "output" discussed herein means transmission of information to external apparatuses, accumulation of information in a record medium, and so on. In order to selectively output or selectively identify desired operation information or state information, each piece of operation information can be added with, for example, an ID in advance to set what operation information indicates the initiation of "normal operation", what operation information indicates the termination of "manual stop" or the like. Furthermore, it is possible to use identification information or other information to analyze what kind of operation information and state information there are.

Figure 2:
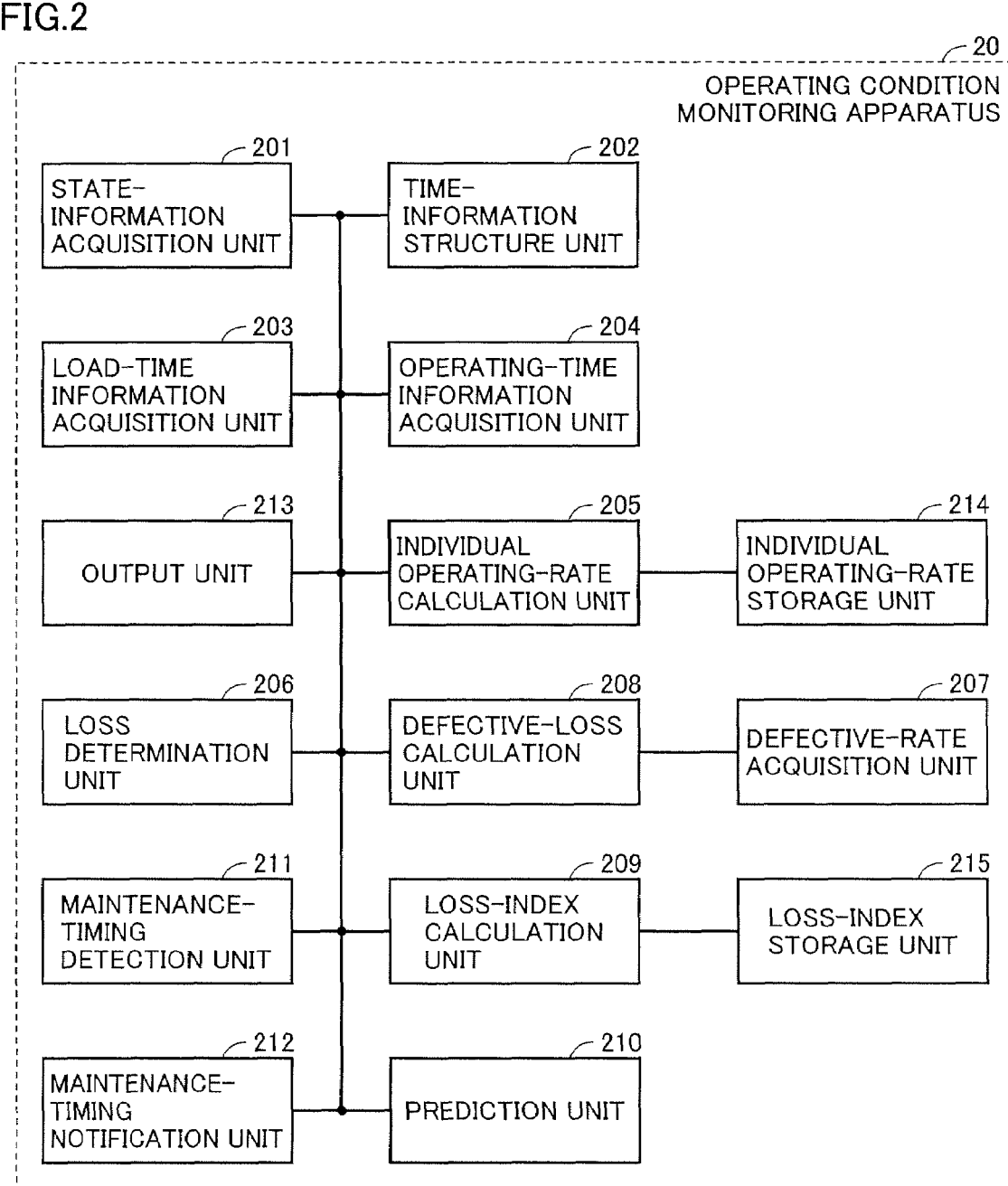
FIG. 2 is a block diagram of the operating condition monitoring apparatus.

FIG. 2 is a block diagram of the operating condition monitoring apparatus 20. The operating condition monitoring apparatus 20 is to monitor the operating condition of one or more production apparatuses 11 that constitute a production line. It should be noted that the operating condition monitoring apparatus 20 does not need to monitor all of the production apparatuses 11 in the production line, but monitors at least one or more production apparatuses 11.

The operating condition monitoring apparatus 20 includes a state-information acquisition unit 201, a time-information structure unit 202, a load-time information acquisition unit 203, an operating-time information acquisition unit 204, an individual operating-rate calculation unit 205, a loss determination unit 206, a defective-rate acquisition unit 207, a defective-loss calculation unit 208, a loss-index calculation unit 209, a prediction unit 210, a maintenance-timing detection unit 211, a maintenance-timing notification unit 212, an output unit 213, an individual operating-rate storage unit 214 and a loss-index storage unit 215.

The state-information acquisition unit 201 directly or indirectly obtains one or more pieces of state information about production apparatuses 11 from the production apparatuses 11. As long as the operating condition monitoring apparatus 20 obtains one or more pieces of state information as a result, the information may be obtained by either simultaneous acquisition of one or more pieces of state information or individual acquisition, for example, receipt of the information in real time. In the case where the operating condition monitoring apparatus 20 receives state information in real time through the state-information acquisition unit 201, the received state information is successively stored in a record medium such as memory. In this embodiment, the state-information acquisition unit 201 obtains the state information from the data collection system 13. The state-information acquisition unit 201 can obtain the state information in any manner. For example, it is possible to receive the state information transmitted from the data output apparatus 134 of the data collection system 13 or retrieve the state information that is stored by the data output apparatus 134 in a removable record medium such as flash memory and CD. Alternatively, state information manually input by a user through an input device or the like is also acceptable. The state-information acquisition unit 201 accumulates the obtained state information in a record medium such as memory. The state-information acquisition unit 201 can be an MPU or memory, or may be a wireless or a wired reception unit. The processing performed by the state-information acquisition unit 201 is generally provided by software that is recorded in a record medium, such as a ROM, but may also be provided by hardware (a special circuit).

The time-information structure unit 202 prepares load-time information that indicates load time within a predetermined period and operating-time information that indicates operating time within the predetermined period, both relating to one or more production apparatuses, based on the state information obtained by the state-information acquisition unit 201. The predetermined period discussed herein is any period of time. The load time is time allocated to production within the predetermined period, specifically, time in which a production apparatus 11 must run to achieve a production plan. The load time can be calculated by subtracting scheduled downtime of the production apparatus 11 from the above-mentioned predetermined period. The operating time is uptime of the production apparatus 11 within the predetermined period. Specifically, the operating time is determined by subtracting inoperable time of the production apparatus 11 for its own cause, such as malfunction, from the above-mentioned load time. In other words, downtime of the production apparatus 11 caused by a stop of the other production apparatus 11 is included in the operating time, because the downtime is a part of operable time for the production apparatus 11. In short, the operating time is calculated by subtracting downtime caused by the production apparatus itself from the above-mentioned load time. The time-information structure unit 202 in this embodiment prepares the load-time information indicating the load time and the operating-time information indicating the operating time based on the state information obtained by the state-information acquisition unit 201. The "predetermined period" discussed herein is at least one part of a period in which each production apparatus 11 in the production line can be brought into operation, for example, at least one part of a period in which measurement of the operation information is performed for the production apparatuses 11 or a period in which monitoring of the production apparatuses 11 is performed. This predetermined period can be set to any length. In this embodiment, the time-information structure unit 202 prepares the load-time information in the following manner. Given that the state information obtained by the state-information acquisition unit 201 contains the initiation time and termination time of four states of "normal operation", "abnormal stop", "manual stop" and "stop caused by work", the period (time) when each production apparatus is in the four states can be calculated for each production apparatus 11 with the use of the state information. To this end, the time-information structure unit 202 calculates "downtime caused by the production apparatus itself", of one or more production apparatuses 11, that is the sum of a time of "abnormal stop" state and a time of "manual stop" state immediately thereafter, among one or more times of "manual stop" state. Both the time of "abnormal stop" state and time of "manual stop" state are determined based on the state information obtained by the state-information acquisition unit 201. In addition, the time-information structure unit 202 calculates "downtime caused by the other production apparatus" that is the sum of a time of "stop caused by work" state and a time of "manual stop" state immediately thereafter. Both the time of "stop caused by work" state and time of "manual stop" state are determined based on the state information obtained by the state-information acquisition unit 201. Furthermore, the time-information structure unit 202 calculates the sum total of thus obtained "downtime caused by the production apparatus itself", "downtime caused by the other production apparatus" and a time of "normal operation" state determined based on the state information obtained by the information acquisition unit 201 within the above-mentioned predetermined period in order to prepare information indicating the total sum. This total sum information is the above-mentioned load-time information. Furthermore, the time-information structure unit 202 calculates the sum total of the above-mentioned time of "normal operation" state determined based on the state information obtained by the state-information acquisition unit 201 and "downtime caused by the other production apparatus" within the above-mentioned predetermined period in order to prepare information indicating the total sum. This total sum information is the above-mentioned operating-time information. Since the "manual stop" state is brought by the mixed causes of the other production apparatus and the production apparatus itself, it is difficult to classify one or more of the times of the "manual stop" state into either downtime caused by the other production apparatus or downtime caused by the production apparatus itself. However, this embodiment allows the times of "manual stop" state to be appropriately categorized according to the state of production apparatus 11 immediately before the "manual stop" state. Specifically, if the state of a production apparatus 11 immediately before the "manual stop" state is the "abnormal stop" state, the time of "manual stop" state immediately after the "abnormal stop" state corresponds to downtime resulting from recognition of "abnormal stop" by an operator, which is considered to be downtime allocated to eliminating causes of the production apparatus's abnormal stop, and which is therefore categorized into "downtime caused by the production apparatus itself". If the state of the production apparatus 11 immediately before the "manual stop" state is the "stop caused by work" state, the time of "manual stop" state immediately after the "stop caused by work" state corresponds to downtime resulting from recognition of "stop caused by work" by an operator, which is considered to be downtime allocated to eliminating causes of the other production apparatus's stop relating to the work, and which is therefore categorized into "downtime caused by the other production apparatus". The time-information structure unit 202 may categorize the time of "manual stop" state immediately after the normal operation state, among the times of "manual stop" state determined based on the state information, into "downtime caused by setup task". The "downtime caused by setup task" is previously planned downtime, more specifically downtime to change product model to be manufactured or the like. Thus categorized "downtime caused by the production apparatus itself", "downtime caused by the other production apparatus", and "downtime caused by setup task" can be output into a certain form such as a timing chart, graph and table by the output unit 213, which will be described later. This output allows operators to grasp what condition each production apparatus 11 was in and when the production apparatus 11 fell into the condition, and, if the production apparatus has stopped, what stopped the production apparatus, and to analyze for causes. If the time-information structure unit 202 can eventually determine "downtime caused by the production apparatus itself" and "downtime caused by the other production apparatus" for each production apparatus 11 in the same method as the above-mentioned method, the state information obtained by the state-information acquisition unit 201 can be temporarily divided into new state information categorized by the causes of a stoppage, and the time-information structure unit 202 determines "downtime caused by the production apparatus itself" and "downtime caused by the other production apparatus" based on the previously categorized state information. The "categorizing" discussed herein is to discriminate the state information and other information through the processing of computers, for example, to give a distinctive designation to the information, or to store information that belongs to the same category in the same buffer or the like. The "categorizing" also includes preparation of new information from the existing state information. Specifically, after a production apparatus abnormally stops, a restoration task is performed on the production apparatus. The time of "manual stop" state immediately after the "abnormal stop" state is categorized into a time of a "restoration task" state. Subsequently, the state information defining the time of "manual stop" state is newly categorized into state information of "restoration task". The total time of the "stop caused by work" state and the "manual stop" state immediately thereafter is categorized into a time of "work-caused stop continuation" state. Then, state information defining the total time of the "stop caused by work" state and the "manual stop" state immediately thereafter, in other words state information defining the initial time and termination time of the summed time is prepared and newly categorized into the state information of "work-caused stop continuation". Among thus categorized state information, the sum of the time of "restoration task" and the above-mentioned time of "abnormal stop" state may be defined as "downtime caused by the production apparatus itself", while the sum of the times of "work-caused stop continuation" may be defined as "downtime caused by the other production apparatus". In the case where the state information of "no work for preprocess" and "full work for postprocess" is obtained instead of the state information of "stop caused by work", the sum of downtime caused by "no work for preprocess" and the time of "manual stop" state immediately thereafter is categorized into a time of "no work for preprocess continuation" state, while the sum of downtime caused by "full work for postprocess" and the time of "manual stop" state immediately thereafter is categorized into a time of "full work for postprocess continuation" state. Then, the state information defining the time of "no work for preprocess continuation" state and the time of "full work for postprocess continuation" state can be newly categorized into state information of "no work for preprocess continuation" state and state information of "full work for postprocess continuation" state, respectively. In this embodiment, a description is made particularly to obtain downtime caused by the production apparatus itself and downtime caused by the other production apparatus after the state information obtained by the state-information acquisition unit 201 is newly divided into state information categorized by the causes of a stoppage. The newly categorized state information is at least temporarily accumulated in a record medium (not shown), such as memory. The time-information structure unit 202 can be an MPU or memory. The processing performed by the time-information structure unit 202 is generally provided by software that is recorded in a record medium, such as a ROM, but may also be provided by hardware (a special circuit).

The load-time information acquisition unit 203 obtains load-time information, of one or more production apparatuses, concerning load time that is allocated to production within a predetermined period. In this embodiment, the load-time information acquisition unit 203 obtains load-time information, within the predetermined period, prepared by the time-information structure unit 202; however, its method of obtaining the load-time information is not limited. For example, the load-time information acquisition unit 203 may obtain load-time information prepared by other apparatuses. More specifically, the load-time information acquisition unit 203 can be designed so as to obtain load-time information prepared based on the state information collected by the data collection apparatus 133. The load-time information acquisition unit 203 can be generally an MPU or memory. The processing performed by the load-time information acquisition unit 203 is generally provided by software that is recorded in a record medium, such as a ROM, but may also be provided by hardware (a special circuit).

The operating-time information acquisition unit 204 obtains operating-time information, of one or more production apparatuses, concerning operating time that is an operable time of the production apparatus within a predetermined period. In this embodiment, the operating-time information acquisition unit 204 obtains the operating-time information within the predetermined period, prepared by the time-information structure unit 202; however, its method of obtaining the operating-time information is not limited. For example, the operating-time information acquisition unit 204 may obtain operating-time information prepared by other apparatuses. More specifically, the operating-time information acquisition unit 204 can be designed so as to obtain operating-time information prepared based on the state information collected by the data collection apparatus 133. In the case where the load-time information acquisition unit 203 obtains load-time information prepared by the other apparatus as described above and the operating-time information acquisition unit 204 obtains operating-time information prepared by the other apparatus, the state-information acquisition unit 201 and time-information structure unit 202 can be omitted. The operating-time information acquisition unit 204 can be generally an MPU or memory. The processing performed by the operating-time information acquisition unit 204 is generally provided by software that is recorded in a record medium, such as a ROM, but may also be provided by hardware (a special circuit).

The individual operating-rate calculation unit 205 calculates an individual operating rate, of one or more production apparatuses, by dividing the operating time within a predetermined period indicated in the operating-time information obtained by the operating-time information acquisition unit 204 by the load time within a predetermined period indicated in the load-time information obtained by the load-time information acquisition unit 203. The individual operating rate is a potential operating rate of a single piece of equipment, or a single production apparatus. Specifically, the individual operating rate is a proportion of a time in which possibly the production apparatus has been operated, that is, a time excluding downtime caused by the production apparatus's malfunction or the like to a time allocated to production. The individual operating rate is expressed by "individual operating rate=operating time/load time". It should be noted that the value of the individual operating rate, which is expressed by "operating time/load time", can be anything as long as the value is recognizable, for example, the individual operating rate can be expressed as a percent by multiplying the value calculated by the "operating time/load time" by "100". Alternatively, the individual operating rate can be expressed by subtracting the value determined by "operating time/load time" from "1". The individual operating-rate calculation unit 205 may calculate the individual operating rates for a plurality of predetermined periods. The individual operating-rate calculation unit 205 may accumulate the calculated individual operating rate in a record medium such as memory. The individual operating-rate calculation unit 205 can be generally an MPU or memory. The processing performed by the individual operating-rate calculation unit 205 is generally provided by software that is recorded in a record medium, such as a ROM, but may also be provided by hardware (a special circuit).

There are one or more times of "manual stop" state immediately after the "abnormal stop" state among one or more times of "manual stop" state obtained from the state information of the production apparatus 11, obtained by the state-information acquisition unit 201, and one or more times of "abnormal stop" state immediately before one or more of times of the "manual stop" state obtained from state information. When downtime that is the sum of each one or more time of "manual stop" state immediately after the "abnormal stop" and each of one or more times of "abnormal stop" state immediately before the "manual stop" state is smaller than a predetermined threshold, the loss determination unit 206 determines the downtime as a "lost time caused by temporary stop". Alternatively, when the downtime is greater than the predetermined threshold, the loss determination unit 206 determines the downtime as a "lost time caused by the production apparatus's malfunction". Among one or more times of "manual stop" state obtained from state information, the time of "manual stop" state immediately after "normal operation" state of the production apparatus is determined as a "lost time caused by setup task". The predetermined threshold is used to determine whether the downtime is caused by temporary stop, and, for example, is preset as an average time or the maximum time of temporary downtime, which is the so-called small stop, in the production line. The "lost time caused by setup task" means losses during production since the setup task including model change and preparation for production has stopped the production apparatuses to manufacture the products. It should be noted that these names or titles of the lost time can be altered in any ways. The loss determination unit 206 can be generally an MPU or memory. The processing performed by the loss determination unit 206 is generally provided by software that is recorded in a record medium, such as a ROM, but may also be provided by hardware (a special circuit).

In the case where at least one of one or more production apparatuses 11 is an apparatus for inspecting for defective pieces from products as discussed above, the defective-rate acquisition unit 207 obtains defective rate information that concerns a defective rate of products and is output by the production apparatus 11. For example, the defective-rate acquisition unit 207 receives defective rate information transmitted from the production apparatus 11 for inspecting for defective pieces from products. It is also possible to design the production apparatuses 11 to output the number of defective pieces and the total number of products and to design the defective-rate acquisition unit 207 to calculate the defective rate using the defective quantity and the total product quantity and to prepare and obtain defective rate information that indicates the calculated defective rate. The defective-rate acquisition unit 207 is provided as a wireless or wired reception means. Also, the defective-rate acquisition unit 207 may have an MPU, memory or the like. The processing performed by the defective-rate acquisition unit 207 is generally provided by software that is recorded in a record medium, such as a ROM, but may also be provided by hardware (a special circuit).

The defective-loss calculation unit 208 calculates losses due to defective pieces from the total time of the "normal operation" state, which is determined based on the state information obtained by the state-information acquisition unit 201, and the defective rate indicated in the defective-rate information. The "losses due to defective pieces" is a lost time consumed to manufacture defective pieces instead of proper products within the time of the "normal operation" state. Specifically, the loss due to defective pieces is calculated by multiplying the defective rate by the total time of the "normal operation" state. For the production apparatus 11 for inspecting for defective pieces, the inspection for defective pieces is included in an actual process, and therefore the losses due to defective pieces are included in the total time of the "normal operation" state. Because defective pieces are eliminated by the inspection production apparatus 11, the losses due to defective pieces correspond to "no work" state for other production apparatuses 11, and therefore the lost time caused by the defective pieces is included in downtime caused by the other production apparatus. The defective-loss calculation unit 208 can be generally an MPU or memory. The processing performed by the defective-loss calculation unit 208 is generally provided by software that is recorded in a record medium, such as a ROM, but may also be provided by hardware (a special circuit).

The loss-index calculation unit 209 calculates a loss index from the individual operating rate calculated by the individual operating-rate calculation unit 205 and the load-time information obtained by the load-time information acquisition unit 203, for one or more production apparatuses 11. The loss index indicates losses of the production apparatus caused by a stop of the apparatus itself. The loss index represents, for example, the potential number of products, which would be manufactured if the production apparatus had not stopped because of its own fault, in short, the number of lost products or the amount thereof. Specifically, a stop rate, which is a proportion of stop caused by the production apparatus itself is figured out by "stop rate=1−individual operating rate". The number of lost products is calculated by "the number of lost products=load time×stop rate×theoretical cycle time". The theoretical cycle time is a time required to produce one product. The amount of lost products is calculated by "amount of lost products=the number of lost products×unit cost of the products". The value of theoretical cycle time and unit cost can be stored in a record medium such as memory in advance, or can be given by users through an input interface or the like at an appropriate time. The loss-index calculation unit 209 stores the calculated loss index in a record medium such as memory. The loss-index calculation unit 209 can be designed to calculate the loss index at every preset unit time to store it in the memory, or to store the cumulative total of the loss indexes calculated at every preset unit time in the memory. The loss-index calculation unit 209 can be generally an MPU or memory. The processing performed by the loss-index calculation unit 209 is generally provided by software that is recorded on a record medium, such as a ROM, but may also be provided by hardware (a special circuit).

In the case where the individual operating-rate calculation unit 205 calculates the individual operating rate for a plurality of periods, the prediction unit 210 predicts the change of the individual operating rate from the individual operating rates in every period. Specifically, a linear approximation method or regression analysis method is performed to the time-series movement of the individual operating rate to predict the future movement of the individual operating rate. This method of predicting future values from the values changing in time sequence with the linear approximation method or regression analysis method is a well-known technique and its detailed description is omitted. The prediction of the loss index movement with the loss index instead of the individual operating rate is regarded substantially the same as the prediction of the individual operating rate movement from the individual operating rate. Furthermore, the prediction unit 210 predicts time in which abnormal events occur, of one or more production apparatuses 11, from the prediction results of the individual operating rate change. Specifically, an appropriate predetermined threshold is set in advance. The period, or time of day that is predicted to have an individual operating rate lower than the threshold is determined to be the time the abnormal events will occur. The prediction unit 210 may be allowed to judge the abnormal-event occurrence time as a maintenance time for the production apparatuses 11. The prediction unit 210 can be generally an MPU or memory. The processing performed by the prediction unit 210 is generally provided by software that is recorded in a record medium, such as a ROM, but may also be provided by hardware (a special circuit).

In the case where the individual operating-rate calculation unit 205 calculates the individual operating rate for a plurality of periods, the maintenance-timing detection unit 211 detects a pattern of the individual operating rate change from the individual operating rates in every period in order to detect maintenance timing of the production apparatus 11 based on the changing pattern of the individual operating rates. When there are enough values of the individual operating rate to grasp the trend of the individual operating rate's movement in the individual operating-rate storage unit 214 or other storage medium, the individual operating rate is smoothed by a moving average method. Then, a long-term trend average of the individual operating rate is obtained to detect a time in which the value obtained by the moving average falls below the long-term trend average. Subsequently, a pattern of the individual operating rate change with such a time repeatedly emerged is detected. At last, next maintenance timing is detected or predicted with reference to the repetitive pattern. This prediction result is assumed to be substantially the same even if the loss index is used instead of the individual operating rate. The maintenance-timing detection unit 211 can be generally an MPU or memory. The processing performed by the maintenance-timing detection unit 211 is generally provided by software that is recorded in a record medium, such as a ROM, but may also be provided by hardware (a special circuit).

The maintenance-timing notification unit 212 notifies that the maintenance time has come when the current date and time entered the maintenance period detected by the maintenance-timing detection unit 211 or immediately before the maintenance period. The "notification" discussed herein is realized by a signal light, a warning sound such as a buzzer or an output device such as a display to display that the maintenance time has come. There is no problem if the maintenance-timing notification unit 212 is provided with the output device and so on, or not. Driver software for an output device or driver software for an output device and the output device may be employed to provide the maintenance-timing notification unit 212. In order to judge whether the present time is in the maintenance period or not, the maintenance-timing notification unit 212 can be provided with an MPU, memory, a clock or the like. The processing performed by the maintenance-timing notification unit 212 is generally provided by software, but may also be provided by hardware (a special circuit).

The output unit 213 outputs the individual operating rate calculated by the individual operating-rate calculation unit 205. It is also possible to output the determination results of the loss determination unit 206, the calculation results of the defective-loss calculation unit 208 and the loss index calculated by the loss-index calculation unit 209. The output unit 213 can select the lowest individual operating rate from the individual operating rates calculated for one or more production apparatuses 11 and output the selected individual operating rate so as to be emphasized, for example, to be highlighted. The "emphasized output" is output, or display, for example, of the characters in different font or color, with a background color different from the normal background, or with decoration such as an underline and shading. The output unit 213 can compare the individual operating rates of one or more production apparatuses 11 with a preset threshold and outputs a warning to the production apparatuses 11 associated with the individual operating rates lower than the threshold. The "warning" discussed herein can be, for example, a character string representing "abnormal event was detected" etc., or the highlighted designation of the production apparatus 11 as described above. The output unit 213 can be designed to prepare information indicating restoration priority in the order from the production apparatus 11 having the lowest individual operating rate for one or more production apparatuses 11 and to output the restoration priority. In this case, the priority rank does not need to be assigned to all of the production apparatuses 11, but only a predetermined number of production apparatuses 11 lined up in ascending order of the individual operating rate. Furthermore, the output unit 213 can output information indicating the movement of the individual operating rate in the form of a graph and so on. Such information or a graph may represent the individual operating rate underwent statistic processing such as a moving average. The output unit 213 can also output the prediction results of the individual operating rate change predicted by the prediction unit 210. Furthermore, the output unit 213 can make an output according to the prediction results of the time abnormal events will occur, predicted by the prediction unit 210. The "output according to the prediction results" is, for example, a warning that abnormal events will occur. The output unit 213 can output the downtime caused by the production apparatus itself, downtime caused by the other production apparatus and downtime caused by the setup task, all obtained by the time-information structure unit 202. The "output" discussed herein is a concept including representation on a display, printing on paper or the like by a printer, sound output, transmission to external devices, storage in a record medium and so on. There is no problem to presume that the output unit 213 includes output devices such as a display and printer, and vice versa. Driver software for an output device or driver software for an output device and the output device may be employed to provide the output unit 213. In order to prepare output data, to perform statistical processing, to compare with a threshold and so on, the output unit 213 can be provided with an MPU, memory, etc. The processing performed by the output unit 213 is generally provided by software, but may also be provided by hardware (a special circuit).

The individual operating-rate storage unit 214 stores the individual operating rate calculated by the individual operating-rate calculation unit 205. The individual operating rate is stored with, for example, identification information, such as designation, of the production apparatuses 11 associated with the individual operating rate or information, such as date and a time of day, that specifies the period the individual operating rate was calculated, etc. The individual operating-rate storage unit 214 is preferably a nonvolatile record medium, but can be a volatile record medium.

The loss index storage unit 215 stores the loss index calculated by the loss index calculation unit 209. The loss index is stored with, for example, identification information of the production apparatuses 11 associated with the individual operating rate used to calculate the loss index or information, such as date and a time of day, that specifies the period the individual operating rate was calculated. The loss index storage unit 215 is preferably a nonvolatile record medium, but can be a volatile record medium.

First, the operation of each production apparatus 11 will be briefly described. The production apparatus 11 performs a predetermined process to work which is transferred in sequence through a transferring route. Every time the production apparatus 11 obtains operation information, the production apparatus 11 transmits the operation information to the data collection system. When an abnormal event occurs to the production apparatus 11, output apparatus 14 stops the production apparatus and outputs operation information that indicates the production apparatus 11 has something wrong. The production apparatus 11 stays in a stop state until receiving an instruction from a user even after the user turns off the output indicating the occurrence of abnormality and recognizes the production apparatus's abnormality. When there is no work or full work on the transferring route or the like, the production apparatus 11 stops its production operation and makes an output to indicate that downtime caused by work has occurred. The production apparatus 11 stays in a nonoperating state until receiving an instruction from a user even after the user turns off the output indicating that the downtime caused by the work has occurred and recognizes that the production apparatus 11 has stopped because of the work.

Next, a brief description will be made about the operation of the data collection system 13. The data collection system 13 obtains the operation information output from each production apparatus 11, adds time information to the operation information and accumulates it in memory or the like. In addition, the data collection system 13 outputs state information out of the accumulated operation information to the operating condition monitoring apparatus 20.

Next, a description will be made about the operation of the operating condition monitoring apparatus 20 with reference to the flow chart of FIG. 3. In this embodiment, the state information of each production apparatus 11 is input to the state-information acquisition unit 201 in real time. Every time the new state information is input, the individual operating rate is calculated with the state information including the new state information within a predetermined period.

(step S301) The state-information acquisition unit 201 obtains state information of one or more production apparatuses 11 within a predetermined period. In this embodiment, as an example, the state-information acquisition unit 201 obtains the state information that is successively output from the data collection system 13 in real time and accumulated in the memory or hard disc of the operating condition monitoring apparatus 20, however, the state-information acquisition unit 201 can be designed so as to obtain the state information from the data collection system 13 as appropriate. The state-information acquisition unit 201 temporarily stores the obtained state information in memory or the like. The predetermined period may be previously stored in the memory, or assigned by a user through a reception unit (not shown) or the like. In this embodiment, for the purpose of checking the fluctuations of the individual operating rate in real time, a certain period of time before the present time is set as the predetermined period. The state information obtained herein includes, "normal operation", "abnormal stop", "manual stop", "no work for preprocess" and "full work for postprocess".

(step S302) The time-information structure unit 202 categorizes the state information, which is obtained in step S301 for each production apparatus 11, according to the causes of a stoppage. The categorized state information falls into "normal operation", "abnormal stop", "restoration task", "no work for preprocess continuation" or "full work for postprocess continuation". The "categorizing" discussed herein is to distinguish the state information obtained in step S301, by computer processing, into state information pieces each having a different cause of the stop as a result. The specific categorizing process includes, for example, giving a designation to each piece of the categorized state information so as to be distinguishable, storing the information belonging to the same category in the same buffer, or the like. Furthermore, the "categorizing" also includes preparation of new state information from the existing state information. A more specific categorizing process in step S302 will be described later.

(step S303) The time-information structure unit 202 obtains cause-specific downtime, for each production apparatus 11, that is, "downtime caused by the production apparatus itself" and "downtime caused by the other production apparatus" using the newly obtained state information that is categorized by the causes of a stoppage and obtained in step S302. Specifically, the "downtime caused by the production apparatus itself" is the sum of a time of "abnormal stop" state and a time of "restoration task" state within a predetermined period, while the "downtime caused by the other production apparatus" is the sum of a time of "no work for preprocess continuation" state and a time of "full work for postprocess continuation" state.

(step S304) The time-information structure unit 202 obtains load-time information and operating-time information for each production apparatus 11 using the "downtime caused by the production apparatus itself" and "downtime caused by the other production apparatus" obtained in step S303 and a time of "normal operation" state obtained from the state information. The load-time information indicates the sum of the "downtime caused by the production apparatus itself", "downtime caused by the other production apparatus" and the time of "normal operation" state. The load-time information indicates the sum of the "downtime caused by the other production apparatus" and the time of "normal operation" state.

(step S305) The individual operating-rate calculation unit 205 calculates an individual operating rate for each production apparatus 11 using the load-time information and operating-time information obtained in step S304. Specifically, the individual operating rate is obtained by dividing the operating time by the load time. The calculated individual operating rate is stored in, for example, the individual operating-rate storage unit 214.

(step S306) The output unit 213 outputs, or represents the individual operating rate calculated in step S305 on an output device such as display (not shown). Upon output, the individual operating rates of the plurality of production apparatuses 11 can be simultaneously output, or each of the individual operating rates can be selectively displayed as appropriate in response to a user's instruction. The output unit 213 can determine whether to highlight the production apparatus 11 causing the stop of the production line and place a highlight on the designation of the production apparatus 11 having the lowest individual operating rate, the figure of the lowest individual operating rate and so on. The output unit 213 can determine whether to highlight when it receives an instruction from a reception unit (not shown) or the like. Alternatively the output unit 213 can be previously set to highlight. The individual operating rate can be stored in the memory or the like without being displayed.

(step S307) The output unit 213 prepares information for outputting priority for restoration in the order from the lowest individual operating rates each associated with each of one or more production apparatuses, and outputs the information in an output device such as a display (not shown). If the priority rank is represented by numeric values, for example, the output unit 213 prepares information for outputting the priority with the addition of the values and outputs it. In the case where the display device such as a display already has been displaying other images, for example, an image indicating the individual operating rates, the output unit 213 can superimpose the image for outputting the priority rank to the individual operating rates on the already displayed image, replace the already displayed image with the image of the priority rank, or show the image of the priority rank in a new window. These display manners are applicable in other output steps.

(step S308) The defective-rate acquisition unit 207 obtains the defective rate calculated by production apparatus 11 that inspects products.

(step S309) The defective-loss calculation unit 208 calculates losses due to defective pieces using the defective rate obtained in step S309. Specifically, the defective-loss calculation unit 208 calculates the losses due to defective pieces by multiplying the defective rate obtained in step S309 by the sum total of the times of "normal operation" state of the inspection production apparatus 11. The calculated value is stored in the memory or the like.

(step S310) The loss determination unit 206 determines what kind of lost time the times indicated in the state information of each production apparatus 11 correspond to, and stores the determination results in the memory or the like. The determination results indicate that, for example, what kind of lost time the times indicated in the state information are.

(step S311) The output unit 213 converts the operating condition of each production apparatus 11 into a lost time using the determination results obtained in step S308 and the lost time due to the defective pieces obtained in step S310, and outputs the lost time to a display device such as a display. For example, the operating condition of each production apparatus 11 is output in a graph mapping the proportion of causes of the lost time. This output, or representation for each production apparatus 11 can be made simultaneously, or can be selectively made as appropriate in response to a user's instruction or the like. In this embodiment, the lost time converted from the operating condition is output in a different window from the window displaying the image output in step S306 or the like. It should be noted that in the case where the production apparatus 11 to be output is the inspection production apparatus 11, the lost time caused by defective pieces is replaced with a part of the normal operating state and output. In the case where the production apparatus 11 to be output is not the inspection production apparatus 11, the lost time caused by defective pieces is replaced with a part of downtime caused by work and output. The determination whether the production apparatus 11 to be output is the inspection production apparatus or not can be made by reading out previously stored information indicating whether the production apparatus 11 to be output is the inspection production apparatus or not, in the memory or the like, or by adding information indicating whether the target production apparatus 11 is the inspection production apparatus or not to the state information associated with the production apparatus 11. If the lost time caused by defective pieces is not output, the processes in steps S308 and S309 can be disregarded.

(step S312) The loss-index calculation unit 209 calculates a loss index using the individual operating rate calculated in step S305. The calculated loss index is stored in the loss-index storage unit 215, for example.

(step S313) The output unit 213 outputs the loss index calculated in step S312. In the case where the output unit 213 displays the individual operating rate or other information in step S306, the output unit 213 can display the loss index instead of the individual operating rate, or display the loss index with the individual operating rate.

(step S314) The maintenance-timing detection unit 211 obtains the individual operating rates for a plurality of predetermined periods, calculated by the individual operating-rate calculation unit 205, from the record medium such as memory to calculate maintenance time.

(step S315) The maintenance-timing notification unit 212 determines whether the current or the other date and time are included in the maintenance time calculated by the maintenance-timing detection unit 211. If included, the process goes to step S316. If not included, the process goes to step S317 because there is no need to notify the maintenance time has come.

(step S316) The maintenance-timing notification unit 212 notifies that the maintenance time has come.

(step S317) The prediction unit 210 predicts an individual operating rate based on the individual operating rates for a plurality of predetermined periods that is calculated for each production apparatus 11 and stored in a memory or the like.

(step S318) The prediction unit 210 predicts an abnormality occurrence time based on the prediction result obtained in step S317.

(step S319) The output unit 213 outputs the prediction result of the individual operating rate, which is predicted by the prediction unit 210 in step S317, to an output device such as a display and the prediction result of the abnormality occurrence time predicted in step S318. The prediction results can be separately displayed.

(step S320) The state-information acquisition unit 201 determines whether new state information has been received or not. If received, the process returns to step S301. If not received, the process is terminated. Instead of determining whether the new state information has been received or not, the state-information acquisition unit 201 can determine whether there are any other predetermined periods (times) the individual operating rate being calculated.

Figure 3:
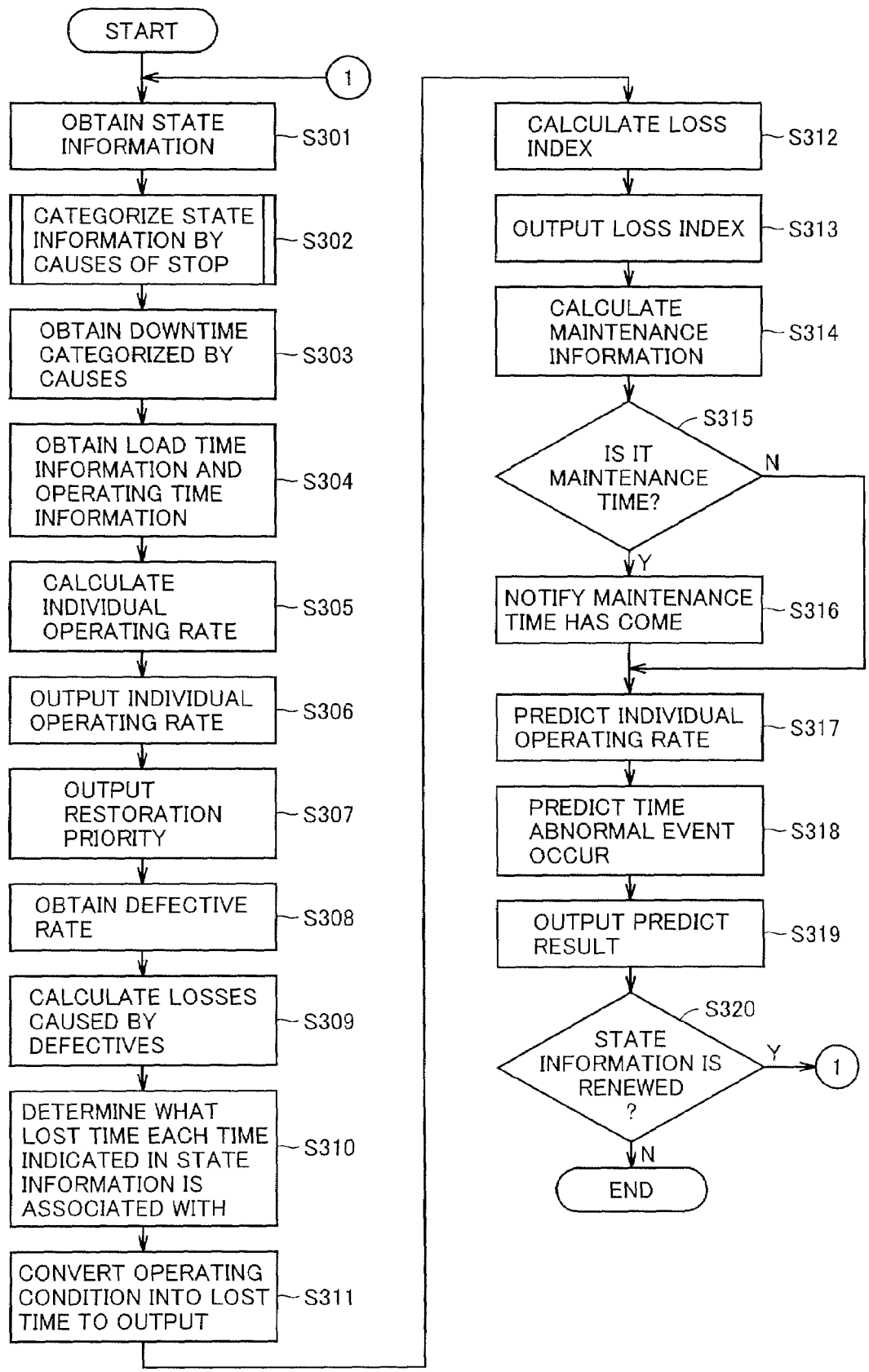
FIG. 3 is a flow chart illustrating an operation of the operating condition monitoring apparatus.

The following processes can be omitted from the flow chart of FIG. 3 if unnecessary: the process of outputting the restoration priority in step S307; the processes of converting the operating condition of each production apparatus 11 into the lost time and outputting it in steps S308 to S311; the processes of outputting the loss index in steps S312 to S313; and the processes of predicting the individual operating rate and the abnormality occurrence time in steps S317 to S319. Alternatively, a step of determining the necessity of the process can be added immediately before each of the above processes, and these processes can be performed only when their necessity is confirmed in each step. In this case, an instruction to perform each of these processes may be transmitted to a reception unit (not shown) or the like to determine whether to perform the processes, or the instruction may be previously set.

In the case where the plurality of individual operating rates calculated for every plurality of different predetermined periods are not accumulated in the memory, more specifically, in the case where the number of individual operating rates stored in the memory is not enough to predict the change of the individual operating rates, the prediction unit 210 can not make the prediction as described above, and therefore the processes performed by the prediction unit 210 from steps S317 to S319 in the flow chart of FIG. 3 can be disregarded.

Interruptions including power-off and completion of the processes terminate the processes in the flow chart of FIG. 3.

Figure 4:
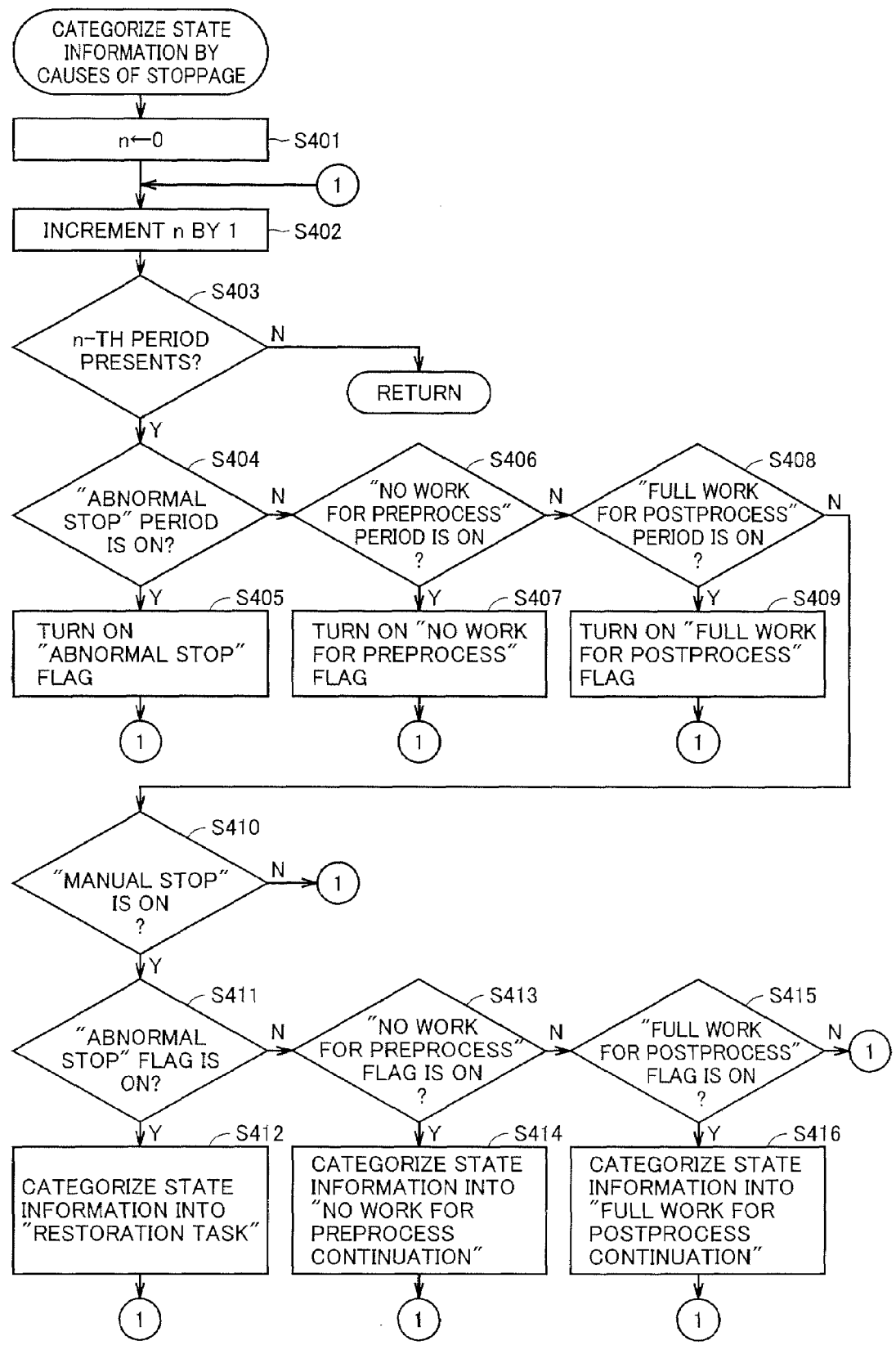
FIG. 4 is a flow chart illustrating a categorizing process of the operating condition monitoring apparatus.

Referring to FIG. 4, a detailed description will be made about a process of categorizing the state information by the causes of a stoppage in step S302 of FIG. 3. In this description, for ease of understanding, state information obtained from a single production apparatus 11 is subjected to the process. However, if there is a plurality of production apparatuses 11, the process applied to the state information obtained from the single production apparatus 11 is repeatedly performed for each of the production apparatuses, or performed to the production apparatuses all together.

(step S401) The time-information structure unit 202 substitutes 0 into a counter value n.

(step S402) The time-information structure unit 202 increments the counter value n by one.

(step S403) Among the periods (times) in which a predetermined state is ON, indicated in the state information obtained by the state-information acquisition unit 201, the time-information structure unit 202 determines whether the n-th oldest period is present. The period in which a predetermined state is ON is a period of a predetermined state whose initiation time and termination time are designated in the state information. The predetermined state discussed herein is any one of the above-mentioned states of "normal operation", "abnormal stop", "manual stop", "no work for preprocess" and "full work for postprocess". If the n-th oldest period is present, the process goes to step S404. If not, the process returns to a higher function.

(step S404) The time-information structure unit 202 determines whether the n-th period indicates that the "abnormal stop" state is "ON", that is, whether the n-th period is a period of "abnormal stop" state. For example, the time-information structure unit 202 determines whether the n-th period is designated by state information indicating the initiation of the "abnormal stop" state and state information indicating the termination thereof. If the n-th period indicates that the "abnormal stop" state is "ON", the process goes to step S405. If not, the process goes to step S 406.

(step S405) The time-information structure unit 202 turns on a flag indicating that the "abnormal stop" state is "ON" and turns off the other flags. Specifically, the value of the flag corresponding to the "abnormal stop" state is set to "1" and the values of the flags corresponding to the other states are set to "0". Then, the process returns to step S402.

(step S406) The time-information structure unit 202 determines, as with step S404, whether the n-th period indicates that the "no work for preprocess" state is "ON". If the n-th period indicates that the "no work for preprocess" state is "ON", the process goes to step S407. If not, the process goes to step S408.

(step S407) The time-information structure unit 202 turns on a flag indicating that the "no work for preprocess" state is "ON" and turns off the other flags. Then, the process returns to step S402.

(step S408) The time-information structure unit 202 determines, as with step S404, whether the n-th period indicates that the "full work for postprocess" state is "ON". If the n-th period indicates that the "full work for postprocess" state is "ON", the process goes to step S409. If not, the process goes to step S410.

(step S409) The time-information structure unit 202 turns on a flag indicating that the "full work for postprocess" state is "ON" and turns off the other flags. Then, the process returns to step S402.

(step S410) The time-information structure unit 202 determines whether the n-th period indicates that the "manual stop" state is "ON". If the n-th time period indicates that the "manual stop" state is "ON", the process goes to step S411. If not, the time-information structure unit 202 turns on a flag indicating the "normal operation" state and turns off the other flags. Then, the process returns to step S402.

(step S411) The time-information structure unit 202 determines whether the flag indicating the "abnormal stop" state is on. If the flag is on, the flag is turned off and the process goes to step S 412. If the flag is off, the process goes to step S413.

(step S412) The time-information structure unit 202 categorizes the n-th period into the time of "restoration task" state. In other words, the state information indicating the initiation of the n-th period and the state information indicating the termination thereof are categorized into state information of "restoration task". Then, the state information categorized in the "restoration task" is stored in a record medium such as memory. Subsequently, the process returns to step S402. The stored state information of "restoration task" will be returned to a higher function ultimately.

(step S413) The time-information structure unit 202 determines whether the flag indicating the "no work for preprocess" state is on. If the flag is on, the flag is turned off and the process goes to step S414. If the flag is off, the process goes to step S415.

(step S414) The time-information structure unit 202 categorizes the sum of the n-th period and the (n−1)th period, which comes immediately before the n-th period, into a period of "no work for preprocess continuation" state. The period of the "no work for preprocess continuation" is a duration of the stop state caused by "no work for preprocess". In other words, the state information indicating the initiation of the (n−1)th period and state information indicating the termination of the n-th period are categorized into the state information of "no work for preprocess continuation". Then, the state information categorized into "no work for preprocess continuation" is stored in a record medium such as memory. Subsequently, the process returns to step S402. The stored state information of "no work for preprocess continuation" will be returned to a higher function ultimately.

(step S415) The time-information structure unit 202 determines whether the flag indicating the "full work for postprocess" state is on. If the flag is on, the flag is turned off and the process goes to step S416. If the flag is off, the other flags are turned off and the process returns to step S402. Alternatively, when the flag is off, a flag indicating a period of "model change" state can be turned on and the other flags can be turned off. Then, the process returns to step S402.

(step S416) The time-information structure unit 202 categorizes the sum of the n-th period and the (n−1)th period, which comes immediately before the n-th period, into a period of "full work for postprocess continuation" state. The period of the "full work for postprocess continuation" is duration of the stop state caused by "full work for postprocess". In other words, the state information indicating the initiation of the (n−1)th period and state information indicating the termination of the n-th period are categorized into the state information of "full work for postprocess continuation". Then, the state information categorized into the "full work for postprocess continuation" is stored in a record medium such as memory. Subsequently, the process returns to step S402. The stored state information of "full work for postprocess continuation" will be returned to a higher function ultimately.

Figure 5:
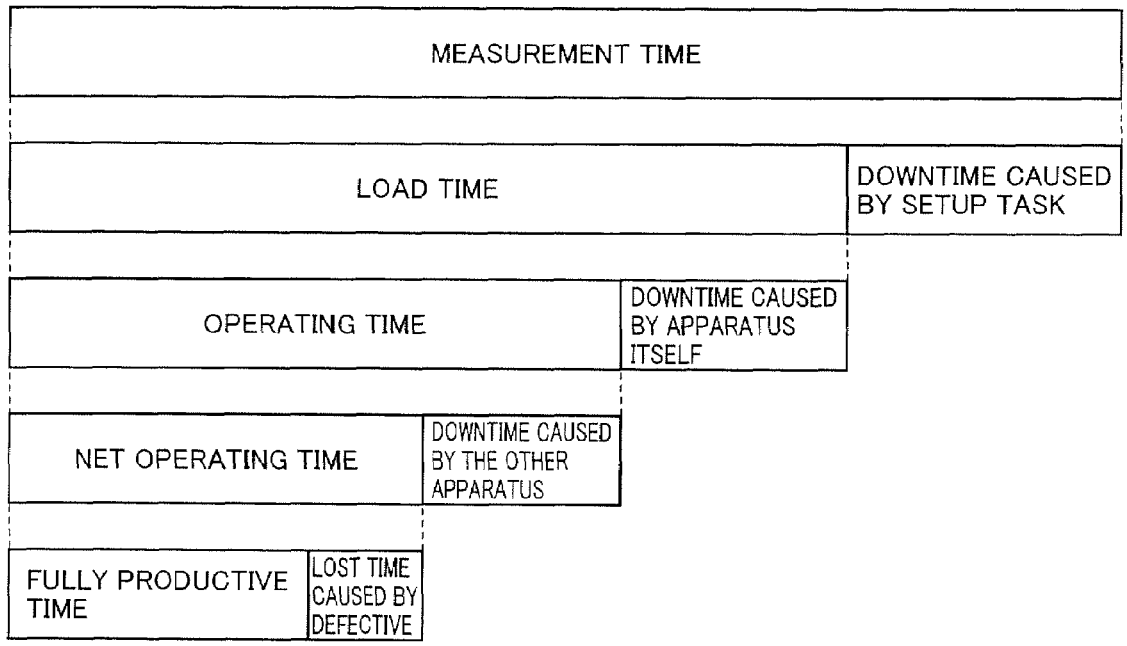
FIG. 5 is a diagram illustrating the relationship of data including load time and other times used to describe the operating condition monitoring apparatus.

FIG. 5 is a diagram for explaining the relationship of data including load time and other times used in the embodiment. In FIG. 5, a measurement time is a period (time) in which measurement for the operation information of the production apparatus 11 is performed, in other words, a period for monitoring the production apparatus 11. This measurement time is actually a time each production apparatus 11 is operable, and corresponds to the predetermined period for obtaining the state information before calculating the individual operating rate. Load time is obtained by subtracting downtime caused by setup from the measurement time. The downtime caused by setup is a time the production apparatus 11 is planned to be stopped because of model change or the like. Operating time is obtained by subtracting downtime caused by the production apparatus itself from the load time and is a time the production apparatus 11 is operable. Net operating time is obtained by subtracting downtime caused by the other production apparatus from the operating time and is a time the production apparatus 11 actually manufactures products. Fully productive time is obtained by subtracting a lost time caused by defective pieces from the net operating time and is a time the production apparatus 11 manufactures good products.

A description will be made about the specific operation of the operating condition monitoring apparatus of the embodiment below. The conceptual diagram of the production system including the operating condition monitoring apparatus is shown in FIG. 1.

In a situation where a plurality of production apparatuses 11 successively coupled in an automated production line manufacture products, each production apparatus 11 outputs its own operation information, which is then collected by the data collection system 13. Upon the collection of the operation information, the data collection system 13 adds information about what time of day the operation information was collected. This operation information can be collected in any methods but the method should include collecting information concerning the operating condition of each production apparatus 11, the time the operating condition occurs, the restoration time and so on, and categorizing the operating condition into five states, in this embodiment, of "normal operation", "abnormal stop", "manual stop", "no work for preprocess", "full work for postprocess". As long as the contents of the information are substantially the same, the name or designation of the information indicating each state is not limited. In this embodiment, among the operation information of each production apparatus 11, information indicating the initiation or termination of the states, "normal operation", "abnormal stop", "manual stop", "no work for preprocess" and "full work for postprocess", with the addition of information of time of day is referred to as "state information". The state information may include or be associated with identification information for identifying each production apparatus 11.

The "normal operation" herein is a state where each production apparatus 11 is normally operating. The "abnormal stop" is a state where each production apparatus 11 stops its operation because an abnormal event, such as failure, occurred in the production apparatus 11. The "manual stop" is a state where each production apparatus 11 is manually stopped by an operator for any reason. The possible reason includes a setup change, a restoration task resulting from an abnormal stop, a stop to deal with an abnormal stop that occurred in the other production apparatus and so on. The "no work for preprocess" is a state where each production apparatus 11 is waiting for work since a production apparatus 11 in the upstream of the production line stops and cannot transfer the work to the next production apparatuses 11. The "full work for postprocess" is a state where each production apparatus 11 is dwelling since a production apparatus 11 in the downstream of the production line stops and cannot transfer the work out of the previous production apparatuses 11.

Next, the state-information acquisition unit 201 obtains the state information from the data collection system 13, for example, in real time and stores it in memory or the like.

Figure 6:
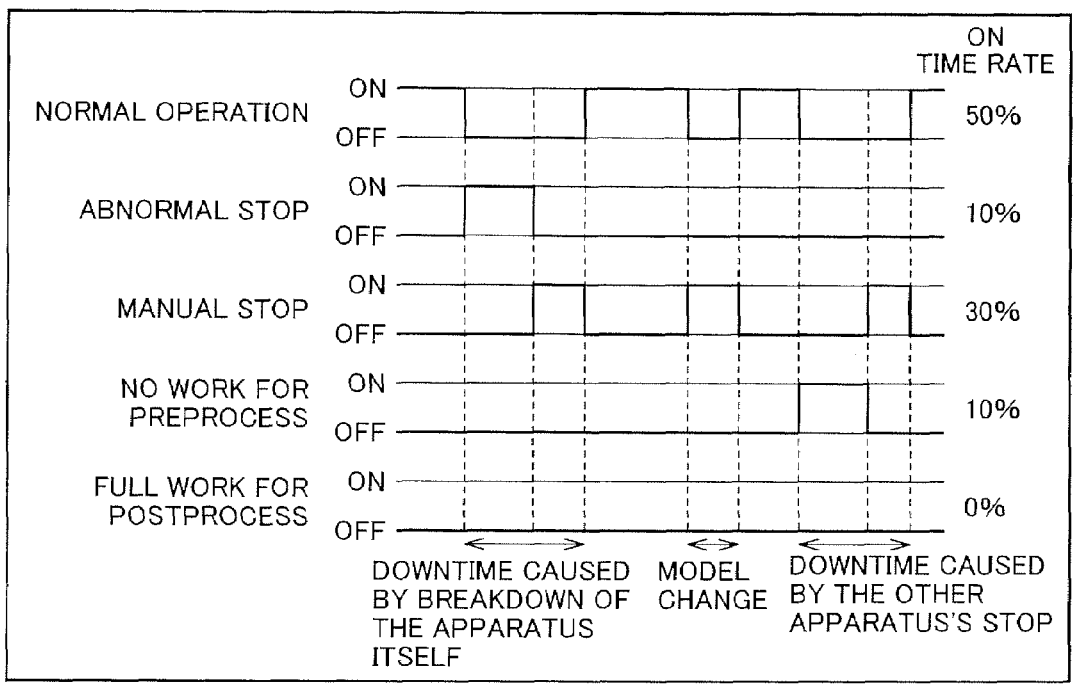
FIG. 6 is a timing chart illustrating the state information obtained by the state-information acquisition unit of the operating condition monitoring apparatus.

FIG. 6 is a timing chart for explaining the state information obtained by the state-information acquisition unit 201. In FIG. 6, the times (periods) indicated by the above-described five pieces of state information of "normal operation", "abnormal stop", "manual stop", "no work for preprocess" and "full work for postprocess", are represented as periods being "ON". The state information indicates the initiation time and termination time of each period in FIG. 6. In FIG. 6, the period of "manual stop" cannot be determined whether it is a downtime caused by the production apparatus itself or a downtime caused by the other production apparatus by reviewing the period of "manual stop" alone.

Figure 7:
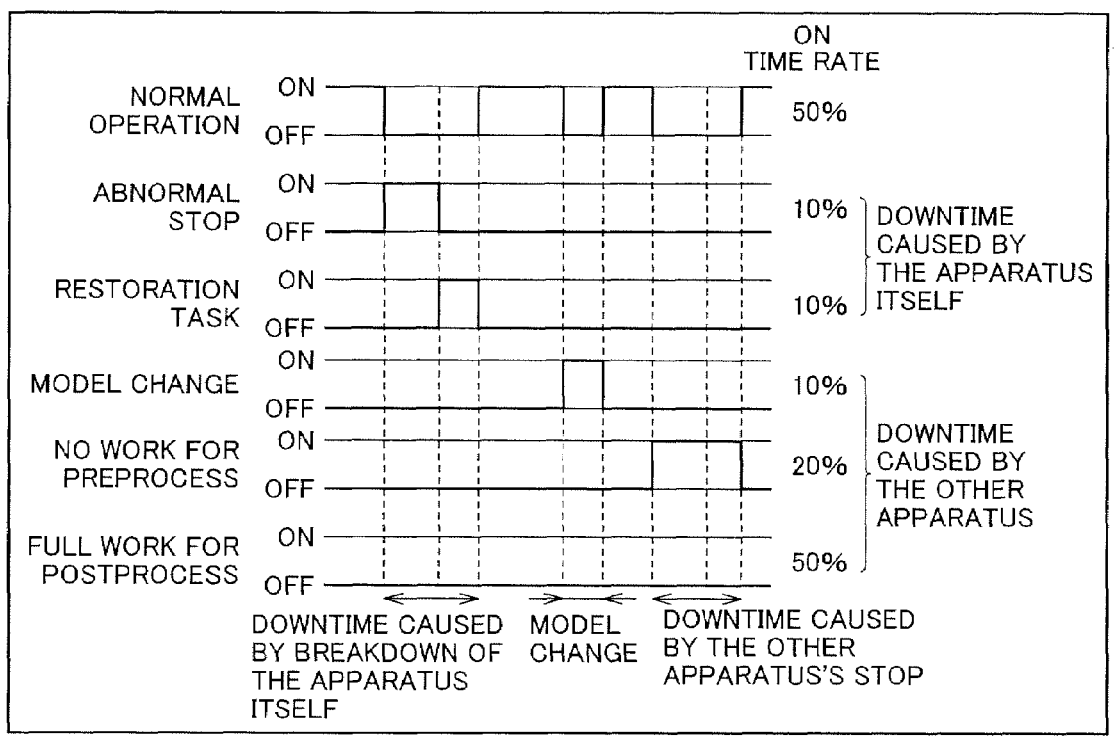
FIG. 7 is a timing chart illustrating the state information categorized according to the causes of a stoppage by the time-information structure unit of the operating condition monitoring apparatus.

Next, the time-information structure unit 202 categorizes the state information, represented in the timing chart of FIG. 6, according to the causes of a stoppage. FIG. 7 is a timing chart for explaining the state information categorized by the causes of a stoppage. The time-information structure unit 202, as shown in FIG. 7, categorizes the times set by the above five pieces of state information into the state information categorized by the causes of a stoppage, that is, "normal operation", "abnormal stop", "restoration task", "model change", "no work for preprocess continuation" and "full work for postprocess continuation". Specifically, the times of "normal operation" and "abnormal stop" in FIG. 6 are categorized into times of the "normal operation" and "abnormal stop" in FIG. 7, in an as-is condition. The state information indicating the initiation time and termination time of the "normal operation" and "abnormal stop" in FIG. 6 is also categorized into state information indicating the initiation time and termination time of the "normal operation" and "abnormal stop" in an as-is condition. Among the times of "manual stop" in FIG. 6, the time of "manual stop" immediately after the time of "abnormal stop" is categorized into the time of "restoration task", while the state information indicating the initiation time and termination time of the time of "manual stop" immediately after the time of "abnormal stop" is categorized into state information indicating the initiation time and termination time of the time of "restoration task". The time of "manual stop" immediately after the time of "normal operation" is categorized into the time of "model change", while state information indicating the initiation time and termination time of the time of "manual stop" immediately after the time of "normal operation" is categorized into state information indicating the initiation time and termination time of the time of "model change". The time of "model change" is allocated to a changeover of the product model to be manufactured by the production apparatus 11. The sum of the time of "no work for preprocess" and the time of "manual stop" immediately thereafter in FIG. 6 is categorized into the time of "no work for preprocess continuation", while the state information indicating the initiation time of the "no work for preprocess" time and the state information indicating the termination time of the "manual stop" time immediately after the "no work for preprocess" time are categorized into state information of "no work for preprocess continuation". The sum of the time of "full work for postprocess" and the time of "manual stop" immediately thereafter is categorized into the time of "full work for postprocess continuation", while the state information indicating the initiation time of the "full work for postprocess" time and state information indicating the termination time of the "manual stop" time immediately after the "full work for postprocess" time are categorized into state information of "full work for postprocess continuation". Among the times obtained from the state information categorized by the time-information structure unit 202, the times of "abnormal stop" and "restoration task" correspond to downtime caused by the production apparatus's own fault such as the apparatus's malfunction or the like. The times of the "no work for preprocess continuation" and "full work for postprocess continuation" correspond to downtime caused by the other production apparatus. Thus categorized state information by the causes of a stoppage can be represented by a graph illustrating time chart as shown in FIG. 7. This representation of the state information categorized by the causes of a stoppage allows users to grasp what condition each production apparatus 11 was in and when the production apparatus 11 was in the condition, and if the production apparatus 11 stopped, what stopped the production apparatus, and to perform an analysis.

FIG. 8 shows an example of state information of a production apparatus 11 referred to as "Equipment A", obtained by the state-information acquisition unit 201. In FIG. 8, "Root Name" is identification information of the production line, namely a designation. "Node Name" is identification information of the production apparatus 11, namely a designation. "Order" is the output order of the state information from the production apparatus 11. "Normal operation", "abnormal stop", "manual stop", "no work for preprocess" and "full work for postprocess" indicate types of the state information. The two adjacent values of "1" in the state information mean that the production apparatus 11 is in the state indicated by the state information during the period (time) specified by the two values of "1", in short, during the ON period. The first value of the two adjacent "1" is state information indicating the initiation of the state information, while the value of the subsequent "1" is state information indicating the termination of the state information. Each of the lines in FIG. 8 corresponds to each piece of state information. For example, the state information in line "2" of "Order" is state information indicating the initiation of the time of "normal operation" state. The state information in the next line "3" of "Order" is state information indicating the termination of the time of "normal operation" state. "Date" indicates a date when the state information is obtained, "Time" indicates a time of day when the state information is obtained, and "Second" indicates an elapsed time (seconds) with reference to the time when the state information is obtained.

FIG. 9 shows an example of state information into which the state information in FIG. 8 is categorized according to the causes of a stoppage by the time-information structure unit 202. In FIG. 9, items having the same name as those in FIG. 8 are the same items as or correspond to the items in FIG. 8. The "normal operation", "abnormal stop", "restoration task", "model change", "no work for preprocess continuation" and "full work for postprocess continuation" are the above described state information categorized by the causes of a stoppage. The two adjacent values of "1" in the state information mean that the production apparatus 11 is in the state indicated by the state information during the period (time) specified by the two values of "1", in short, during the ON period. The first value of the two adjacent "1" is state information indicating the initiation of the time indicated by the state information, while the value of the subsequent "1" is state information indicating the termination of the time indicated by the state information. Each of the lines in FIG. 9 corresponds to each piece of state information categorized by the causes of a stoppage. For example, the state information in line "4" of "Order" is state information indicating that the time of "model change" state is ON, and the next line of "5" of "Order" is state information indicating that the time of "model change" state is OFF. "Date" and "Time" are a date and a time of day, respectively, obtained by categorizing the state information in FIG. 8.

Next, the time-information structure unit 202 determines the sum total of downtime caused by the production apparatus itself and the sum total of downtime caused by the other production apparatus, for each production apparatus 11, from the state information shown in FIG. 9. In order to determine the sum total of the downtime caused by the production apparatus itself, the time-information structure unit 202 calculates the sum total of the time of "abnormal stop" state and the time of "restoration task" state, among the times categorized by the state of the production apparatus 11, which are obtained from the state information categorized by the causes of a stoppage. Specifically, in the state information shown in FIG. 9, a time from line "12" to "13" of "Order" and a time from line "14" to "15" are added to obtain the downtime caused by the production apparatus itself. In order to obtain the sum total of downtime caused by the other production apparatus, the time-information structure unit 202 calculates the sum total of the time of "no work for preprocess continuation" state and the time of "full work for postprocess continuation" state, among the times categorized by state of the production apparatus 11, which are obtained from the state information categorized by the causes of a stoppage. Specifically, in the state information shown in FIG. 9, a time from line "8" to "9" of "Order" is obtained as the downtime caused by the other production apparatus.

Furthermore, the time-information structure unit 202 calculates load time and operating time, for each production apparatus 11, within a predetermined period, i.e., one hour in this embodiment, using the sum total of the downtime caused by the production apparatus itself, the sum total of the downtime caused by the other production apparatus and the state information categorized by the causes of a stoppage in FIG. 9. Specifically, the load time is calculated by adding the sum total of the downtime caused by the production apparatus itself, the sum total of the downtime caused by the other production apparatus and the sum total of the time of "normal operation" state in the state information categorized by the causes of a stoppage in FIG. 9. The operating time is calculated by adding the sum total of the downtime caused by the other production apparatus and the sum total of the time of "normal operation" state in the state information categorized by the causes of the stoppage in FIG. 9. Load-time information that indicates the load time is obtained by the load-time information acquisition unit 203, while operating-time information indicating the operating time is obtained by the operating-time information acquisition unit 204.

Thus calculated load time and operating time of each production apparatus 11 for every one hour are shown in FIG. 10. In FIG. 10, "calculation date and time" indicates the initiation date (Date) and initiation time of day (Time) of a predetermined period, which is information specifying the state information to be calculated. In this embodiment, the predetermined time period is one hour. "Equipment A" to "Equipment D" represents production apparatuses 11 that constitute a production line.

Next, the individual operating-rate calculation unit 205 calculates an individual operating rate within the predetermined period for each production apparatus 11 by dividing the load time indicated in the load-time information obtained by the load-time information acquisition unit 203 by the operating time indicated in the operating-time information obtained by the operating-time information acquisition unit 204. The individual operating rate can be expressed as a percentage by multiplying the divided value by 100. The individual operating-rate calculation unit 205 stores the calculated individual operating rate in a record medium such as memory.

The individual operating rates calculated by the individual operating-rate calculation unit 205 are shown in FIG. 11. It should be noted that FIG. 11 shows some parts having the same names as those in FIG. 10, which are the same as or corresponding to parts in FIG. 10. "ID" is management information for identifying an individual operating rate in every predetermined period.

The output unit 213 displays the individual operating rates calculated by the individual operating-rate calculation unit 205.

Figure 12:
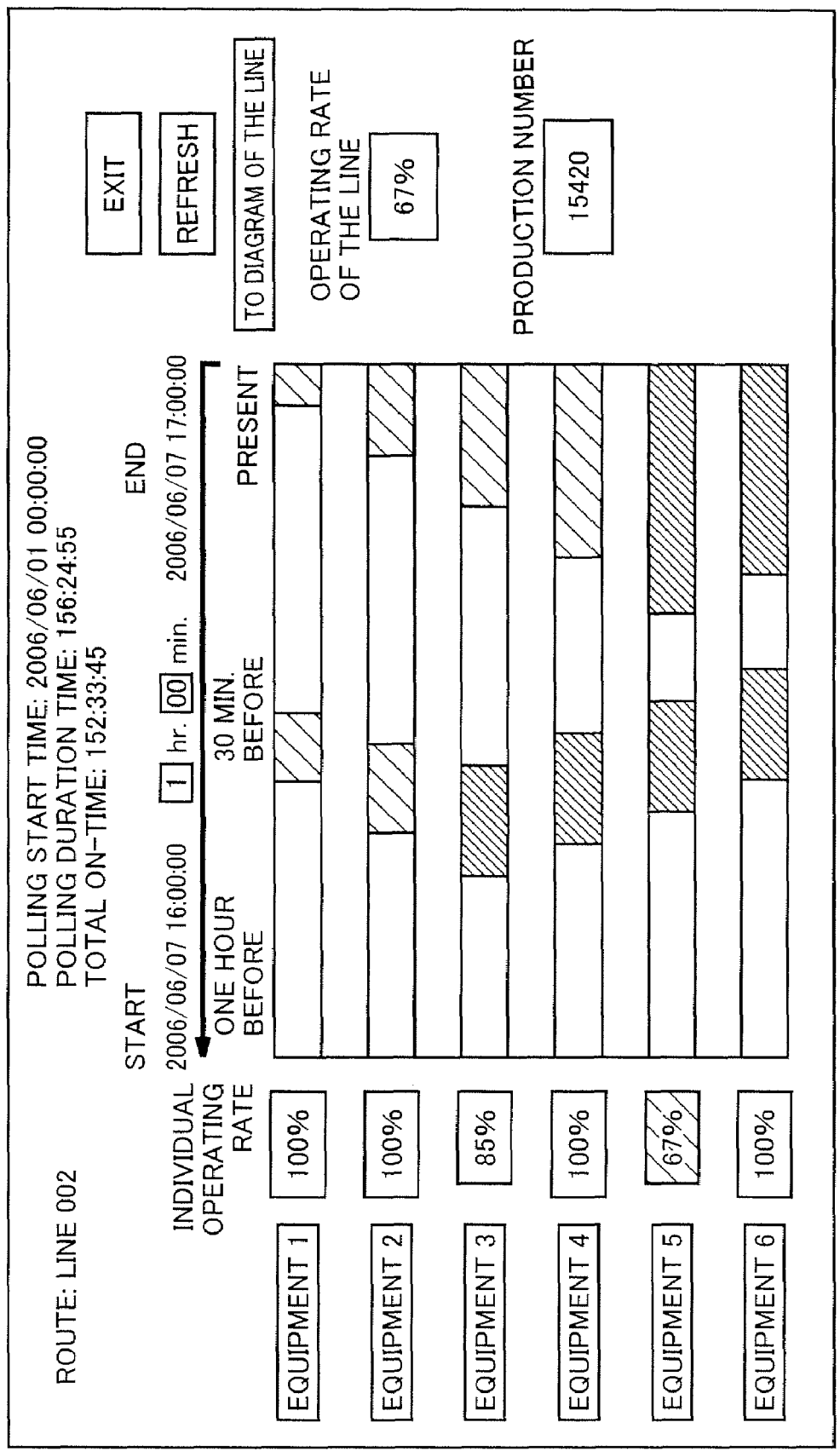
FIG. 12 illustrates an exemplary representation used in the operating condition monitoring apparatus.

FIG. 12 illustrates the first exemplary representation of the individual operating rates calculated by the individual operating-rate calculation unit 205, which is displayed by the output unit 213. The exemplary representation in FIG. 12 shows the different contents from the example shown in FIG. 11 and other drawings. In FIG. 12, each designation of production apparatus 11 and its individual operating rate are arranged along the vertical axis. The horizontal axis is a time axis. The state of each production apparatus is represented by different visual appearances, such as different colors, in a timing chart. For example, green, red, deep green and yellow represent "normal operation", "abnormal stop", "full work for postprocess" and "no work for preprocess", respectively. The visual changes in each state can offer a wide range of display variations. Since the time of day and period of time in which the production apparatus has stopped because of its own fault and the time of day and period of time in which the production apparatus has stopped because of the other production apparatus's fault are represented with different visual appearances, operators can see how the stoppage of a production apparatus 11 caused by its own fault influences the other production apparatuses. The operators can adjust the display width at will. The operating rate of the entire production line (corresponding to so-called "overall equipment effectiveness") and the production number can be displayed on the right side of the screen. FIG. 12 displays the individual operating rates of each production apparatus 11 from the present time to the time one hour before the present time, and the time of day and period of time in which the production apparatus has stopped because of its own fault and the time of day and period of time in which the production apparatus has stopped because of other production apparatus's fault from the present time to the time one hour before the present time within a period, with bars. Furthermore, the lowest individual operating rate of production apparatus 11 is searched and highlighted, more specifically hatched in FIG. 12. This can identify the production apparatus 11 that is the biggest factor to lower the operating rate of the production line. For example, with reference to the individual operating rates in FIG. 11, "Equipment C" has the smallest individual operating rate of "0.65" at "19:00" on "14/04/2006", and therefore the individual operating rate of Equipment C is highlighted. The representation shown in FIG. 12 allows operators to find out in a instance the production apparatus 11 having a low individual operating rate, which chiefly causes reduction of the operating rate of the production line. Regarding production number, equipment for collecting data in the production line is set so as to generate a pulse when the preset number of the work has passed through the equipment and to count the pulses obtained in a predetermined period to roughly estimate the production number. Then, the rough estimation result of the production number is displayed. For example, if a pulse is set to be generated for every twenty products and then ten pulses are generated within the predetermined period, the number of work can be obtained by: 20×10=200. In the case where the individual operating-rate calculation unit 205 or the like calculates the individual operating rate in real time with the state information obtained by the state-information acquisition unit 201 in real time, the screen to display the individual operating rate can be set to update its contents in real time. For example, once the operating condition monitoring apparatus 20 obtains new state information, an individual operating rate within the period from the time of day indicated by the time information of the state information to the time one hour before the time is calculated. Based on the calculation result, contents can be displayed in real time. For displaying the contents in real time, the timing chart display window can be set to be scrolled rightward so that the right end of the time axis always indicates the present state.

Figure 13:
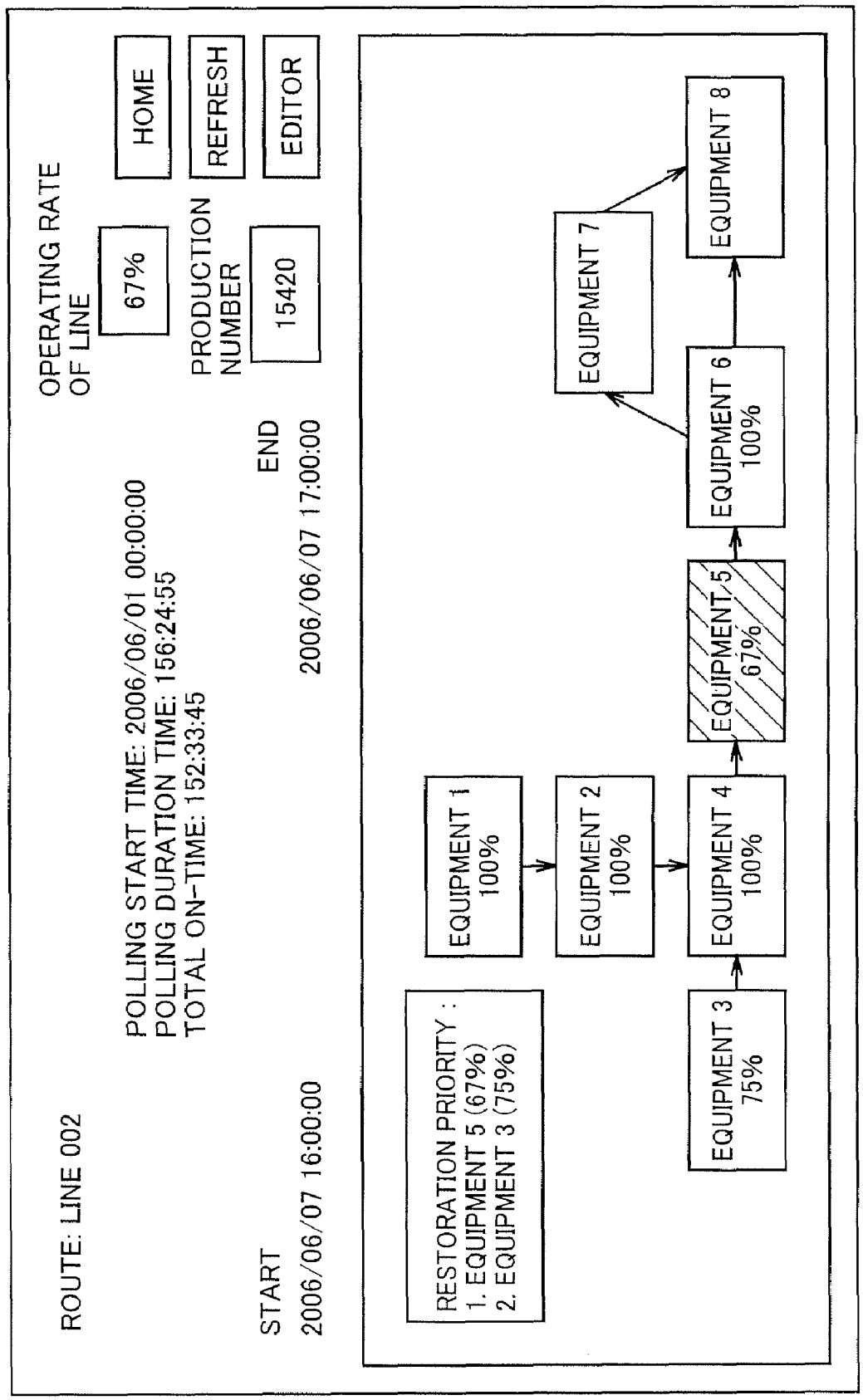
FIG. 13 illustrates an exemplary representation used in the operating condition monitoring apparatus.

FIG. 13 illustrates the second exemplary representation of the individual operating rates calculated by the individual operating-rate calculation unit 205, which is displayed by the output unit 213. The exemplary representation in FIG. 13 shows the different contents from the example shown in FIG. 11 and other drawings. In FIG. 13, the output unit 213 displays the calculated individual operating rates each associated with each production apparatus 11 that constitutes a production line as a percent, and also outputs two production apparatuses 11 that have the first and second lowest individual operating rates, among one or more production apparatuses 11, with a priority rank of restoration. In order to facilitate the understanding of the individual operating rates, the individual operating rates of each production apparatus 11 are preferably arranged so as to correspond to the arrangement of the production apparatuses 11 on the production line. In addition, the priority rank of the restoration can be displayed for each production apparatus 11. As with the case of FIG. 12, the individual operating rates of each production apparatus 11 are previously compared with a predetermined threshold stored in memory, and the individual operating rate lower than the threshold is highlighted, in FIG. 13, hatched. Such a presentation allows operators to grasp, through intuition, which part of the production line causes the reduction of the entire production line's operating rate. The priority rank allows the operators to find out the production apparatus 11 that should be improved, without fail. With reference to the individual operating rates shown in FIG. 11, the priority order of restoration among the production apparatuses 11, from "Equipment A" to "Equipment D" at "19:00" on "14/04/2006" is: Equipment C (individual operating rate=0.65); Equipment A (individual operating rate=0.79); Equipment B (individual operating rate=0.85); and Equipment D (individual operating rate=0.88), which will be assigned to each production apparatus 11 to be displayed.

Next, the loss determination unit 206 determines what kind of lost time each of the times indicated by the state information of the production apparatuses 11 is associated with. Specifically, downtime caused by the production apparatus itself, which is the sum of the time of "abnormal stop" state indicated by the state information and the time of "manual stop" state immediately thereafter, is categorized according to the length of the downtime. More specifically, each of the downtimes caused by the production apparatus itself is compared with a predetermined threshold. If the downtime is longer than the threshold, the downtime is determined to be a "failure loss", which is a lost time caused by breakdowns in the production apparatus 11. If not, the downtime is determined to be a "short time stop loss", which is a lost time caused by a temporary stoppage, or so-called short time stops of the production apparatus 11. The time for "model change" as shown in FIG. 9 is categorized into a "loss caused by setup task" which is a lost time allocated to setting up the production apparatus 11.

Next, the defective-rate acquisition unit 207 obtains a defective rate calculated by production apparatus 11 for inspecting products. The defective-loss calculation unit 208 calculates a "defective loss", which is a lost time caused by defective pieces, by multiplying the defective rate obtained by the defective-rate acquisition unit 207 by the sum total of the times in which the inspection production apparatus 11 is in a "normal operation" state. The total sum of the times in which the production apparatus 11 is in the "normal operation" state can be obtained from values calculated by the time-information structure unit 202 as described above.

Figure 14:
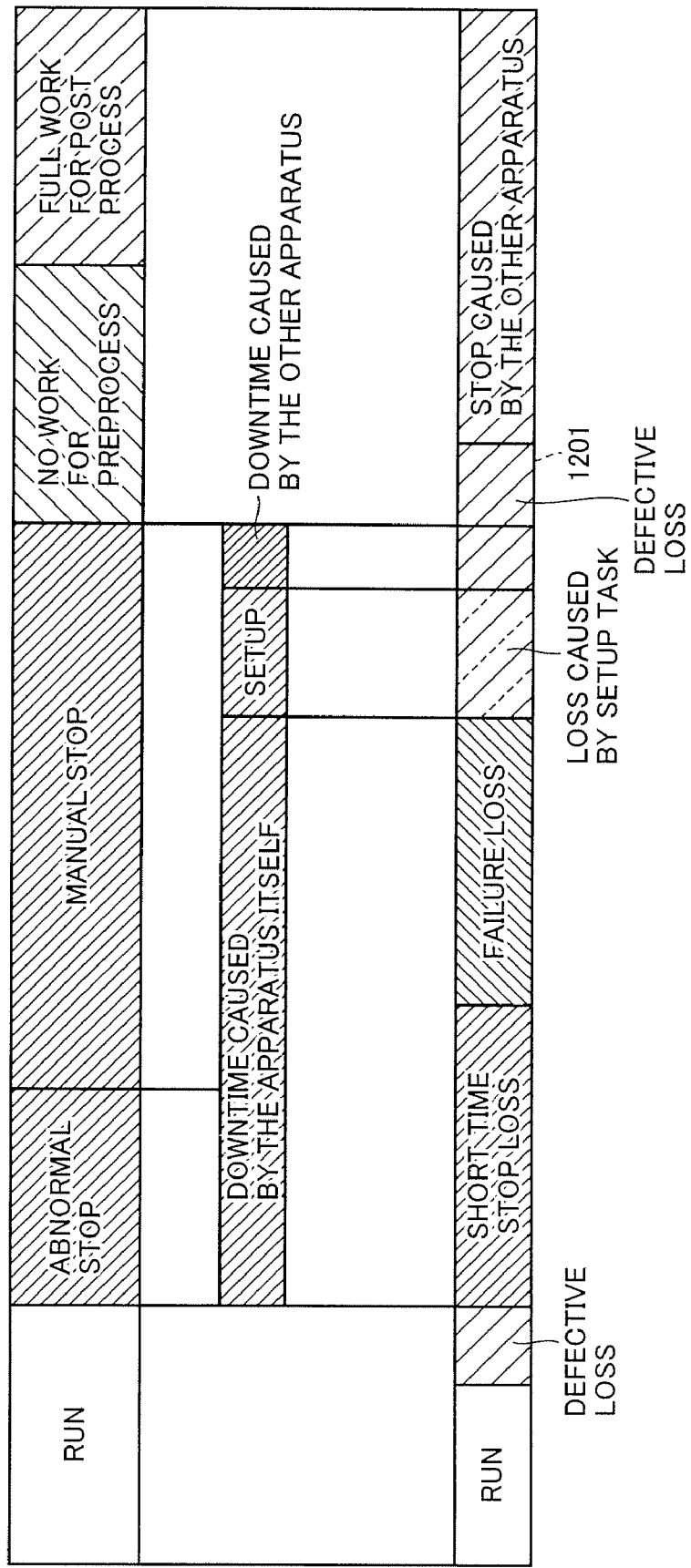
FIG. 14 illustrates an exemplary representation used in the operating condition monitoring apparatus.

Then, the output unit 213 displays the results made by the loss determination unit 206 and the "defective loss" calculated by the defective-rate acquisition unit 207 on a display. FIG. 14 illustrates an exemplary representation whose contents are different from the example shown in FIG. 11 and other drawings. In FIG. 14, the uppermost part is a graph showing a proportion of periods indicated by the state information in a period allocated to determination of the operating condition, while the lowermost part is segmented periods of the period allocated to determination of the operating condition using the results made by the loss determination unit 206 and the "defective loss" calculated by the defective-rate acquisition unit 207. In FIG. 14, the production apparatus 11 to be displayed is the production apparatus to inspect for defective pieces, and therefore the "defective loss" is displayed in a segment in the period of the "normal operation" state. In the case where the production apparatus to be displayed is not the production apparatus 11 to inspect for defective pieces, the "defective loss" is included in a segment 1201, which is indicated by a dotted line in FIG. 14, of the period of the "no work for preprocess" state. The middle part of the FIG. 14 explains the relationship between the uppermost part and the lowermost part, and does not need to be displayed practically on a display or the like.

Next, the loss-index calculation unit 209 calculates a stop rate, in which each production apparatus 11 stops because of its own fault, with the use of the individual operating rate of each production apparatus 11 calculated by the individual operating-rate calculation unit 205. Specifically, the stop rate can be calculated by substituting the individual operating rate of each production apparatus 11 shown in FIG. 11 into the following equation; "stop rate=1−individual operating rate". In addition, the loss-index calculation unit 209 calculates the loss index such as the number of lost products, which is the number of products that would have been manufactured if only the stoppage did not occur, and the amount (amount of loss) with the use of the stop rate, stores the loss index in memory or the like, in this embodiment in the loss-index storage unit 215, and then displays the loss index in a display device such as a display (not shown). The number of lost products can be calculated by substituting the stop rate calculated for each production apparatus 11, the load time of each production apparatus 11 shown in FIG. 10 and the theoretical cycle time previously stored in a record medium such as memory into the following equation; "number of lost products=load time×stop rate×theoretical cycle time". The theoretical cycle time is the number of products that can be manufactured per unit of time, for example per one second. The theoretical cycle time can be set to be received any time through a reception unit (not shown) upon the manufacture of the number of lost products. The amount of loss can be calculated by substituting the calculated number of lost products and unit price of the product previously stored in the record medium such as memory into the following equation; "amount of loss=the number of lost products×unit price of the product". The unit price of the product can be set to be received any time through the reception unit (not shown) upon manufacture of the number of lost products. The loss-index calculation unit 209 can store and display values or cumulative values of the loss index obtained at a predetermined interval. For example, when the theoretical cycle time of the products is "0.01/second", the number of lost products, which is a loss index, of "Equipment A" during a time between "13:00" and "14:00" on "14/04/2006" is obtained by substituting the load time in FIG. 10 and the individual operating rate in FIG. 11 into the above equation, resulting in "the number of lost products=3506×(1−0.37)×0.01=22.0878 (products)". When the unit price of a product is 50 yen, the amount of loss, which is a loss index, is "amount of loss=22.0878×50=1104.39 (yen)". Such calculation results are displayed in a display or the like as a loss index of "Equipment A" in a between "13:00" and "14:00" on "14/04/2006".

If the individual operating rate data, for example on the order of one year to five years, is accumulated in the individual operating-rate storage unit 214, and the data volume is large enough to analyze the trend of the individual operating rate movement, the data of the plurality of individual operating rates calculated by the individual operating-rate calculation unit 205 is smoothed by a moving average method to prepare information indicating the movement of the individual operating rate, more specifically to prepare a graph. Then, the information is output to analyze the trend of the individual operating rates.

Figure 15:
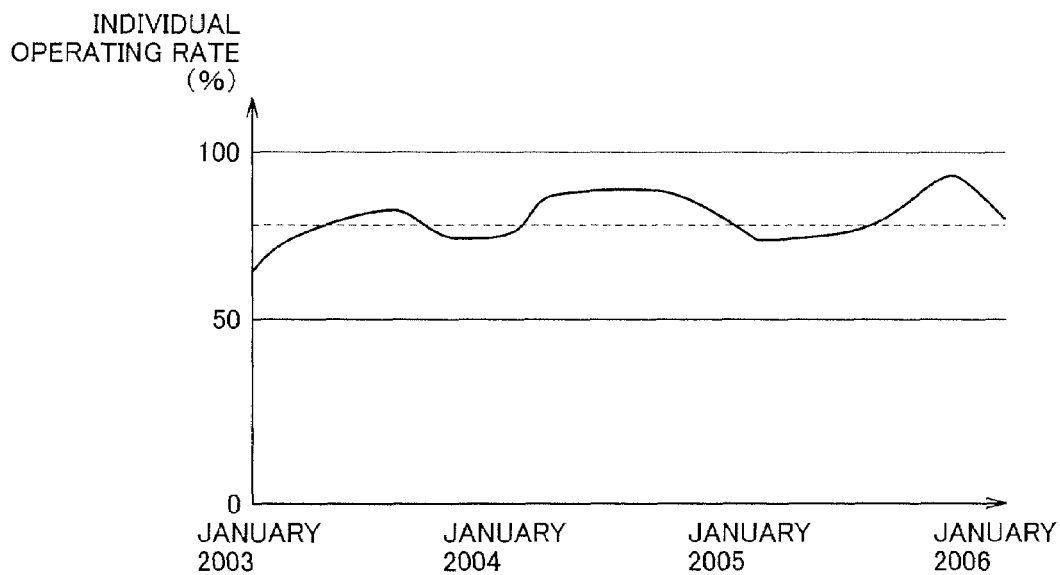
FIG. 15 illustrates an exemplary representation used in the operating condition monitoring apparatus.

FIG. 15 illustrates an exemplary representation of a graph showing the movement of an individual operating rate of a production apparatus 11. It should be noted that the exemplary representation in FIG. 15 represents a different example from that in FIG. 11 and other drawings. Such display of the individual operating rate allows operators to grasp the long-term trend of the individual operating rate. For example, it is found that this production apparatus 11 tends to decrease its individual operating rate around January every year. This long-term trend allows the operators to decide, for example, to perform maintenance every November, which is immediately before the time the individual operating rate is lowered.

The maintenance-timing detection unit 211 can prepare the information indicating the individual operating rate movement like the one output by the output unit 213 or obtain the information from the output unit 213, detect the moving pattern of the individual operating rate based on the information indicating the individual operating rate movement, and detect the maintenance time for one or more production apparatuses from the moving pattern of the individual operating rate. Specifically, the average of the individual operating rates within a period shown in FIG. 15 is calculated. If the average value is "75%", the average value is defined as a threshold. Then, one or more periods when the individual operating rate are equivalent to or lower than the threshold is obtained. Then, the maintenance-timing detection unit 211 detects cycles of such a period and then predicts when the time in which the individual operating rate becomes equivalent to or lower than the threshold next based on the cycles. Subsequently, a period to maintain the production apparatus 11 is set immediately before the predicted time. Given that the time in which the individual operating rate is equivalent to or lower than the threshold comes every "January", the yearly maintenance timing is detected and set in December just before January.

When the current date and time of day reaches the maintenance time, which is detected and set by the maintenance-timing detection unit 211, in this embodiment "December", the maintenance-timing notification unit 212 reports that the maintenance time has come to the operators by means of a warning device, signaling light, sign and so on.

The output unit 213 can output the loss index movement calculated by the loss-index calculation unit 209 instead of the individual operating rate movement. As with the case of individual operating rate, the maintenance-timing detection unit 211 can obtain the information indicating the loss index movement and detect the maintenance timing based on the information. In addition to the above method, the maintenance timing can be predicted based on the individual operating rate movement with the use of a prediction model, generally so-called time series analysis or time series prediction, such as an AR model (auto regressive analysis), linear approximation, polynomial approximation and log approximation.

Next, the prediction unit 210 predicts future values by means of well-known techniques such as linear approximation and regressive analysis based on the individual operating rates for a plurality of different periods stored in the individual operating-rate storage unit 214. Specifically, based on the individual operating rates for the plurality of different periods stored in the individual operating-rate storage unit 214, in this embodiment based on the individual operating rates calculated for the different time periods on an hour-by-hour basis up to the present time of 19:00, the prediction unit 210 predicts the individual operating rate at 20:00 which is one hour after 19:00, by means of a cubic approximation curve. If the individual operating rate of "Equipment C" in FIG. 11 is processed by a cubic approximation method with x as time, the following approximate expression can be obtained.

$$y = -1.8 \times x^3 + 23.1 \times x^2 - 86.15 \times x + 153.33$$

From the expression, the individual operating rate at 20:00 is predicted to be 21%. This prediction result is displayed by the output unit 213 in a display or the like.

Figure 16:
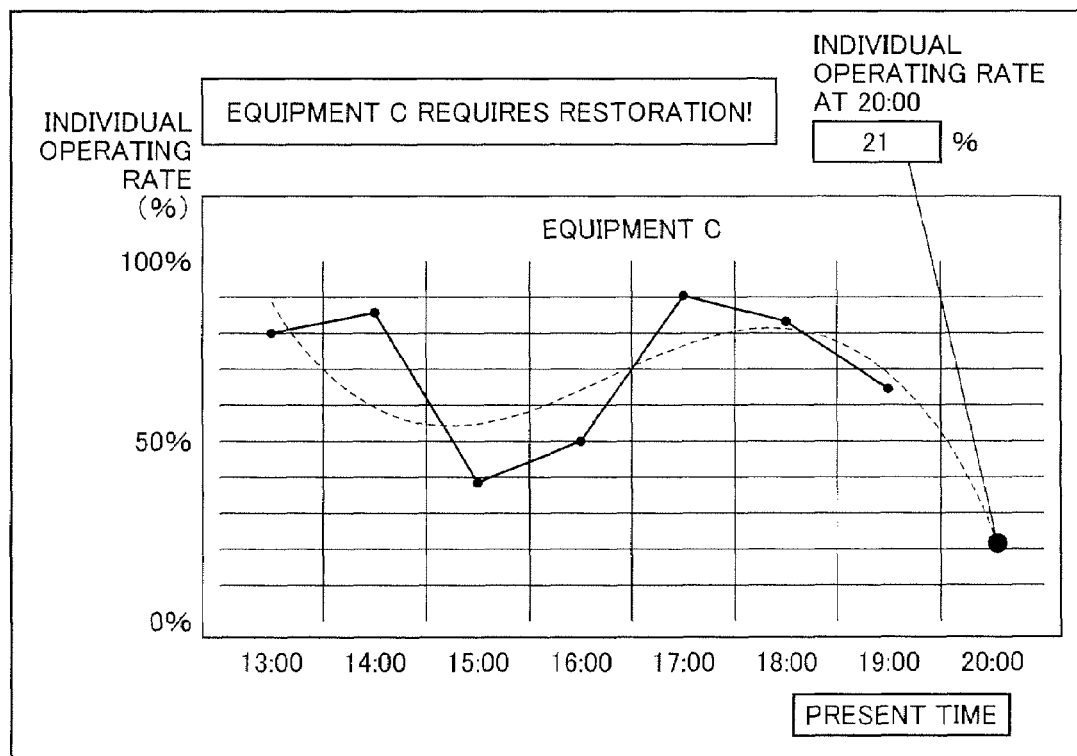
FIG. 16 illustrates an exemplary representation used in the operating condition monitoring apparatus.

FIG. 16 illustrates the prediction result predicted by the prediction unit 210 and output by the output unit 213. It should be noted that the exemplary representation in FIG. 16 represents a different example from that in FIG. 11 and other drawings. In FIG. 16, the time-varying individual operating rate is represented with a solid line, while the cubic approximation curve is represented with a dotted line. The output unit 213 compares the predicted value of the individual operating rate with a preset threshold. If the predicted value is lower than the threshold, the time when the predicted value is obtain is predicted to be the time when abnormal events are encountered. An output is made according to the prediction result, and a message "Equipment C requires restoration!!" is displayed in this embodiment. With the warning display urging restoration of "Equipment C", the movement of the individual operating rate up to the present and the individual operating rate predicted to be in one hour are displayed to enhance motivation to restore "Equipment C". Furthermore, a loss index associated with the prediction value can be calculated by the loss-index calculation unit 209 and displayed with the prediction value in order to enhance the motivational effect.

According to the embodiment as above described, an operating condition of each production apparatus constituting a production line is displayed in the form of the individual operating rate obtained by dividing the operating time by the load time, thereby quantifying downtime caused by the production apparatus itself of each production apparatus. Relative comparisons among the production apparatuses by reference to the quantified value, or individual operating time enable identification of the production apparatus causing productivity reduction of the production line.

Although the operating-time information and load-time information are prepared based on the state information in the embodiment, the load-time information and load-time information can be prepared in any manner in the present invention. For example, the operating-time information and load-time information can be output from the production apparatuses in the production line and obtained by the operating-time information acquisition unit 204 and the load-time information acquisition unit 203, respectively.

The load-time information can be obtained by subtracting a time of the "setup task" state from a target period to calculate the individual operating rate, in other words a period when operation information of the production apparatus 11 is being measured or a period when the production apparatus is being monitored. For example, the above-described time of the "setup task" state is a time of the "manual stop" state immediately after a time of the "normal operation" state of the production apparatus 11. The time of the "setup task" state can be obtained in the same manner as the above-described "downtime caused by the production apparatus itself" and so on.

Although the load-time information and operating-time information are prepared by the operating condition monitoring apparatus 20 in the embodiment, the data collection system 13 or other apparatus also can prepare the load-time information and operating-time information and other information based on state information.

If it is possible, the load-time information and operating-time information can be prepared based on information other than the state information in the above embodiment. In this case, there is no problem if the load-time information and operating-time information prepared not based on the state information but based on the other information obtained from the production apparatus 11, data collection system 13 or the like are set to be obtained by the load-time information acquisition unit 203 and operating-time information acquisition unit 204.

Each process (function) in the above embodiment can be realized by centralized processing in a single apparatus (system) or by distributed processing in a plurality of apparatuses.

Each element in the above embodiment may be special hardware, but some of the elements are implementable by software that realizes the embodiment by running a program. For example, a software program stored in a record medium such as a hard disk and semiconductor memory is read out and executed by a program executing unit such as a CPU, thereby realizing the elements. The software that realizes the operating condition monitoring apparatus according to the embodiment is a program as described below. The program allows a computer to monitor the operating condition of one or more production apparatuses. More specifically, the program executes: a load-time information acquisition step of obtaining load-time information, of one or more production apparatuses, concerning load time allocated to production within a predetermined period; an operating-time information acquisition step of obtaining operating-time information, of one or more production apparatuses, concerning operating time when the production apparatus is operable within the predetermined period; an individual operating rate calculation step of calculating an individual operating rate of one or more production apparatuses by dividing the operating time indicated in the operating-time information by the load time indicated in the load-time information; and an output step of outputting the individual operating rate.

In the acquisition step of obtaining the information and the output step of outputting the information and so on, processes performed by hardware, for example, processes performed by a modem, an interface card and so on in a transmission step (processes feasible by only hardware) are not included in the above program.

In addition, prior to execution, the program can be downloaded from a server or the like or read out from a certain record medium (for example, optical disc such as CD-ROM, magnetic disc and semiconductor memory) on which the program is stored.

Furthermore, the program can be executed in a single computer or a plurality of computers. In other words, centralized processing or distributed processing is available.

The present invention is not limited to the above described embodiments and can be variously modified, and these modifications are also included within the technical scope of the present invention.

As described above, the operating condition monitoring apparatus and things pertinent to the apparatus according to the present invention are suitable for monitoring the production apparatuses constituting a production line, and particularly are useful to detect the production apparatus causing the reduction of production efficiency of the production line.

What is claimed is:

1. An operating condition monitoring apparatus that monitors the operating condition of one or more production apparatuses, comprising:
    a load-time information acquisition unit for obtaining load-time information, of the one or more production apparatuses, concerning load time allocated to production within a predetermined period;
    an operating-time information acquisition unit for obtaining operating-time information, of the one or more production apparatuses, concerning operating time within the predetermined period, the operating time being the time the production apparatuses are in an operable state;
    an individual operating-rate calculation unit for calculating an individual operating rate of the one or more production apparatuses by dividing the operating time indicated in the operating-time information by the load time indicated in the load-time information;
    an output unit for outputting the individual operating rate;
    a state-information acquisition unit for obtaining state information, of the one or more production apparatuses, concerning an initiation time and termination time of each of states including a normal operating state, an abnormal stop state, a manual stop state, and a stop state caused by work; and
    a time-information structure unit for calculating downtime caused by the production apparatus itself, of one or more production apparatuses, by adding the time of the abnormal stop state obtained from the state information and the time of the manual stop state that comes immediately after the abnormal stop state and is obtained from the state information, and calculating downtime caused by another production apparatus by adding the time of the manual stop state obtained from the state information and the time of stop state caused by work that comes immediately after the manual stop state and is obtained from the state information, for preparing the load-time information indicating the sum total of the time of the normal operating state obtained from the state information, the downtime caused by the production apparatus itself and the downtime caused by the other production apparatus, and preparing the operating-time information indicating the sum total of the time of the normal operating state and the downtime caused by the other production apparatus.

2. The operating condition monitoring apparatus according to claim 1 further comprising:
    a loss determination unit for determining downtime that is the sum of each of one or more times of the manual stop state immediately after the time of the abnormal stop state and each of one or more times of the abnormal stop immediately before the one or more times of the manual stop state to be a lost time caused by a temporary stop when the downtime is smaller than a previously set predetermined threshold, determining the downtime to be a lost time caused by a failure of the production apparatus itself when the downtime is larger than the predetermined threshold, and determining time of the manual stop state immediately after the time of the normal operating state to be a lost time caused by a setup task, the times of the manual stop state immediately after the time of the abnormal stop state and the time of the manual stop state immediately after the time of the normal operating state are selected among one or more times of the manual stop state obtained from the state information, wherein the output unit outputs a determination results of the loss determination unit.

3. The operating condition monitoring apparatus according to claim 1, wherein at least one of the one or more production apparatuses is an apparatus for inspecting for defective pieces in products, and further comprising:
    a defective-rate acquisition unit for obtaining defective rate information concerning a defective rate of products, the defective rate information being output from the apparatus for inspecting for defective pieces; and
    a defective-loss calculation unit calculating losses caused by the defective pieces based on the sum of the times of the normal operating state obtained from the state information and the defective rate indicated in the detective rate information, wherein the output unit outputs a calculation result of the defective-loss calculation unit.

4. The operating condition monitoring apparatus according to claim 1, further comprising:
    a loss-index calculation unit for calculating a loss index of the one or more production apparatuses based on the individual operating rate and the load-time information, the loss index indicating losses occurring because of the downtime caused by the production apparatus itself, wherein the output unit outputs the loss index.

5. The operating condition monitoring apparatus according to claim 1, wherein the output unit selects the lowest individual operating rate from individual operating rates of the one or more production apparatuses and highlights the selected individual operating rate upon output.

6. The operating condition monitoring apparatus according to claim 1, wherein the output unit compares the individual operating rates of the one or more production apparatuses with a predetermined threshold and outputs a warning about the production apparatuses having the individual operating rate lower than the predetermined threshold.

7. The operating condition monitoring apparatus according to claim 1, wherein the output unit outputs restoration priority of the one or more production apparatuses in the order from the apparatus having the lowest individual operating rate to the highest.

8. The operating condition monitoring apparatus according to claim 1, wherein
    the load-time information acquisition unit an operating-time information acquisition unit obtain the load-time information and operating-time information for a plurality of predetermined periods,
    the individual operating-rate calculation unit calculates the individual operating rate in every predetermined period, and
    the output unit outputs information indicating the movement of the individual operating rate.

9. The operating condition monitoring apparatus according to claim 1, wherein
    the load-time information acquisition unit and operating-time information acquisition unit obtain the load-time information and operating-time information for a plurality of predetermined periods, and the individual operating-rate calculation unit calculates the individual operating rate in every predetermined period, the operating condition monitoring apparatus further comprising:

a maintenance-timing detection unit for detecting a pattern of the individual operating rate changes from the movement of the individual operating rate in every predetermined period and detecting a maintenance time of the one or more production apparatuses based on the pattern of the individual operating rate changes; and a maintenance-timing notification unit for notifying that the maintenance time has come when the maintenance time detected by the maintenance-timing detection unit came.

10. The operating condition monitoring apparatus according to claim 1, wherein the load-time information acquisition unit and operating-time information acquisition unit obtain the load-time information and operating-time information for a plurality of predetermined periods, and the individual operating-rate calculation unit calculates the individual operating rate in every predetermined period, and the operating condition monitoring apparatus further comprising:

a prediction unit for predicting changes in the individual operating rate from the individual operating rate in every predetermined period, wherein the output unit outputs prediction results of the changes in the individual operating rate.

11. The operating condition monitoring apparatus according to claim 10, wherein the prediction unit further predicts the time abnormal events occur in the one or more production apparatuses based on the prediction result, and the output unit produces an output according to the prediction result about the time the abnormal events occur.

12. A method for monitoring the operating condition of one or more production apparatuses with a load-time information acquisition unit, an operating-time information acquisition unit, an individual operating-rate calculation unit and an output unit, comprising:

a load-time information acquisition step wherein the load-time information acquisition unit obtains load-time information of the one or more production apparatuses concerning load time allocated to production within a predetermined period;

an operating-time information acquisition step wherein the operating-time information acquisition unit obtains operating-time information of the one or more production apparatuses concerning operating time within the predetermined period, and the operating time is the time the production apparatuses are in an operable state;

an individual operating rate calculation step wherein the individual operating-rate calculation unit calculates an individual operating rate of the one or more production apparatuses by dividing the operating time indicated in the operating-time information by the load time indicated in the load-time information;

an output step wherein the output unit outputs the individual operating rate;

a state-information acquisition step wherein a state-information acquisition unit obtains state information, of the one or more production apparatuses, concerning an initiation time and termination time of each of states including a normal operating state, an abnormal stop state, a manual stop state, and a stop state caused by work; and a time-information structure step wherein a time-information structure unit calculates downtime caused by the production apparatus itself, of one or more production apparatuses, by adding the time of the abnormal stop state obtained from the state information and the time of the manual stop state that comes immediately after the abnormal step state and is obtained from the state information, and calculates downtime caused by another production apparatus by adding the time of the manual stop state obtained from the state information and the time of stop state caused by work that comes immediately after the manual stop state and is obtained from the state information, for preparing the load-time information indicating the sum total of the time of the normal operating state obtained from the state information the downtime caused by the production apparatus itself and the downtime caused by the other production apparatus, and preparing the operating-time information indicating the sum total of the time of the normal operating state and the downtime caused by the other production apparatus.

13. A computer-readable medium storing a program configured to be executed in a computer to monitor the operating condition of one or more production apparatuses, the program comprising:

load-time information acquisition instructions for obtaining load-time information of the one or more production apparatuses concerning load time allocated to production within a predetermined period;

operating-time information acquisition instructions for obtaining operating-time information of the one or more production apparatuses concerning operating time within the predetermined period, the operating time being the time the production apparatuses are in an operable state;

individual operating rate calculation instructions for calculating an individual operating rate of the one or more production apparatuses by dividing the operating time indicated in the operating-time information by the load time indicated by the load-time information; and output instructions for outputting the individual operating rate;

state-information acquisition instructions for obtaining state information, of the one or more production apparatuses, concerning an initiation time and termination time of each of states including a normal operating state, an abnormal stop state, a manual stop state, and a stop state caused by work; and time-information structure instructions for calculating downtime caused by the production apparatus itself, of one or more production apparatuses, by adding the time of the abnormal stop state obtained from the state information and the time of the manual stop state that comes immediately after the abnormal stop state and is obtained from the state information, and calculates downtime caused by another production apparatus by adding the time of the manual Stop state obtained from the state information and the time of stop state caused by work that comes immediately after the manual stop state and is obtained from the state information, for preparing the load-time information indicating the sum total of the time of the normal operating state obtained from the state information, the downtime caused by the production apparatus itself and the downtime caused by the other production apparatus, and preparing the operating-time information indicating the sum total of the time of the normal operating state and the downtime caused by the other production apparatus.

* * * * *